(12) United States Patent
Kiyoi et al.

(10) Patent No.: US 6,509,973 B2
(45) Date of Patent: Jan. 21, 2003

(54) APPARATUS FOR MEASURING THREE-DIMENSIONAL SHAPE

(75) Inventors: Kazuya Kiyoi, Tondabayashi (JP); Katsutoshi Tsurutani, Osaka (JP)

(73) Assignee: Minolta Co., Ltd., Osaka (JP)

( * ) Notice: Subject to any disclaimer, the term of this patent is extended or adjusted under 35 U.S.C. 154(b) by 60 days.

(21) Appl. No.: 09/822,834

(22) Filed: Apr. 2, 2001

(65) Prior Publication Data

US 2002/0036779 A1 Mar. 28, 2002

(30) Foreign Application Priority Data

Mar. 31, 2000 (JP) .......................................... 2000-97241

(51) Int. Cl.[7] .......................... G01B 11/24; G01B 11/30
(52) U.S. Cl. ...................................... 356/606; 356/601
(58) Field of Search ................................. 356/601, 602, 356/606, 607, 612, 614, 623; 250/559.22, 559.23

(56) References Cited

U.S. PATENT DOCUMENTS

| | | | | |
|---|---|---|---|---|
| 4,199,253 A | * | 4/1980 | Ross | 356/5.04 |
| 5,046,162 A | | 9/1991 | Ishikawa et al. | 358/42 |
| 5,110,203 A | * | 5/1992 | MacCabee | 356/5.04 |
| 5,668,631 A | | 9/1997 | Norita et al. | 356/376 |
| 5,686,992 A | * | 11/1997 | Kawamoto | 356/601 |
| 6,108,090 A | * | 8/2000 | Ishihara | 356/601 |
| 6,141,105 A | | 10/2000 | Yahashi et al. | 356/376 |
| 6,268,918 B1 | * | 7/2001 | Tanabe et al. | 356/226 |

FOREIGN PATENT DOCUMENTS

JP 9-196632 7/1997

OTHER PUBLICATIONS

"An Accurate Calibration Method for a Range Finder Based on a 3D Model of the Optical System", Toshio UESHIBA et al., Electronics information communication workshop article D–II, vol. J74–D–11 No. 9, pp. 1227–1235, '91/9', w/English Translation.

"Geometric Correction of Images without Camera Registration", Yasuhiro Onodera et al., Electronics information communication workshop document, PRU91–113, w/ English translation "Pattern Recognition and Understanding Workship" of Electronics Information Communication Institute, Japan, Jan. 24, 1992.

"Non–Contact Three–Dimensional Measuring Device Voxelan", Quality and Effective Use of Data, by Shu Satoh & Katsunori Hori of Hamano Engineering K.K., Japan Industrial Publishing Co., Ltd., Gazo Labo (Image Laboratory) Magazine, Japan, Oct. 1, 1998.

\* cited by examiner

Primary Examiner—Ricky Mack
(74) Attorney, Agent, or Firm—McDermott, Will & Emery

(57) ABSTRACT

The present invention provides a three-dimensional measuring apparatus comprising a light projector for projecting light to an object, a light receiving element, a light receiving optical system for leading light projected on and then reflected by the object to the light receiving element, and a calculator for obtaining measured data for three-dimensional shape measurement based on signals output from the light receiving element. The light receiving optical system includes a first optical filter which transmits only light having substantially the same range of wavelengths as that of the light projected from the light projector, at least one second optical filter which transmits light having a different range of wavelengths as that of the first optical filter and a filter selector which selectively locates one of the first optical filter or the second filter or filters at an optical path of the light receiving optical system.

14 Claims, 30 Drawing Sheets

F I G. 8
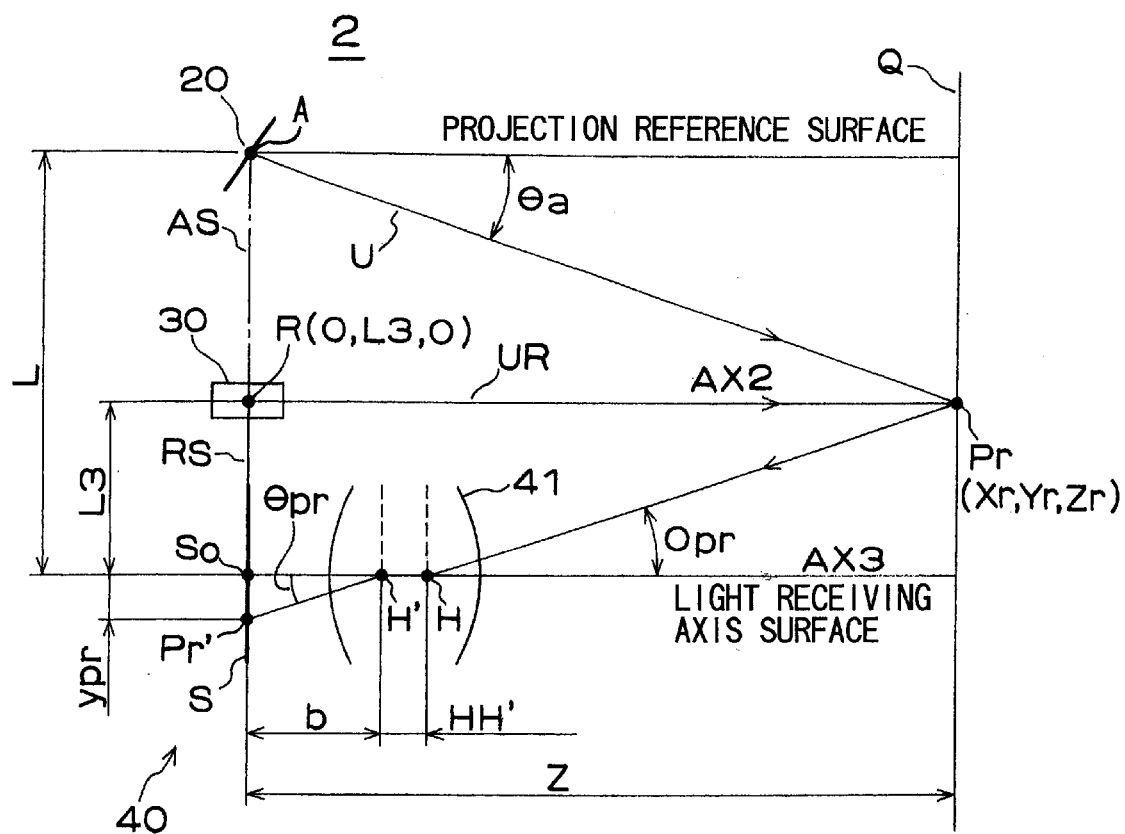

F I G. 9
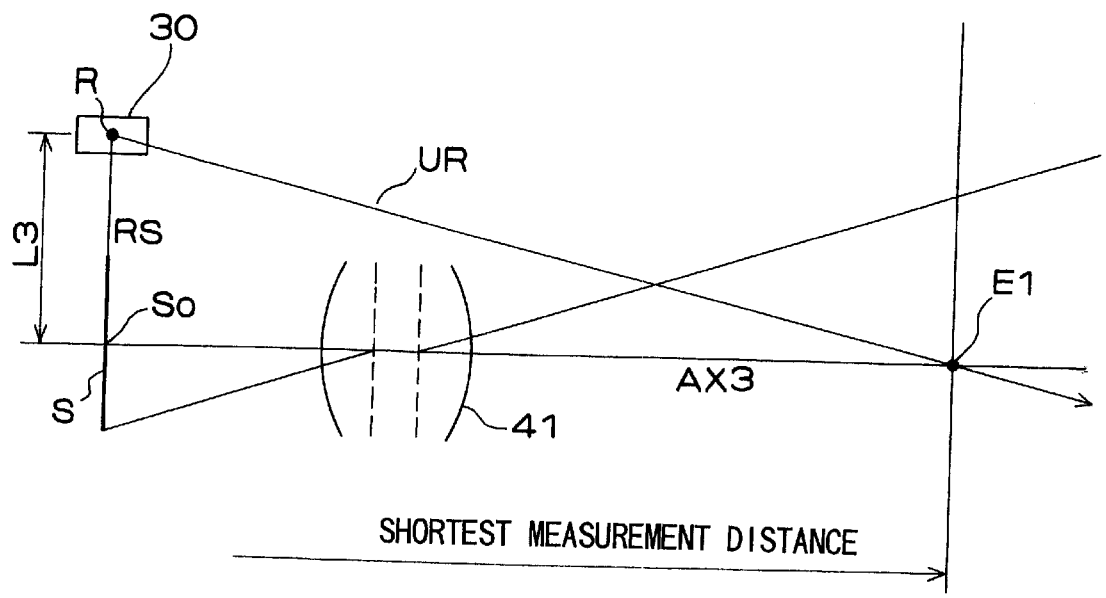

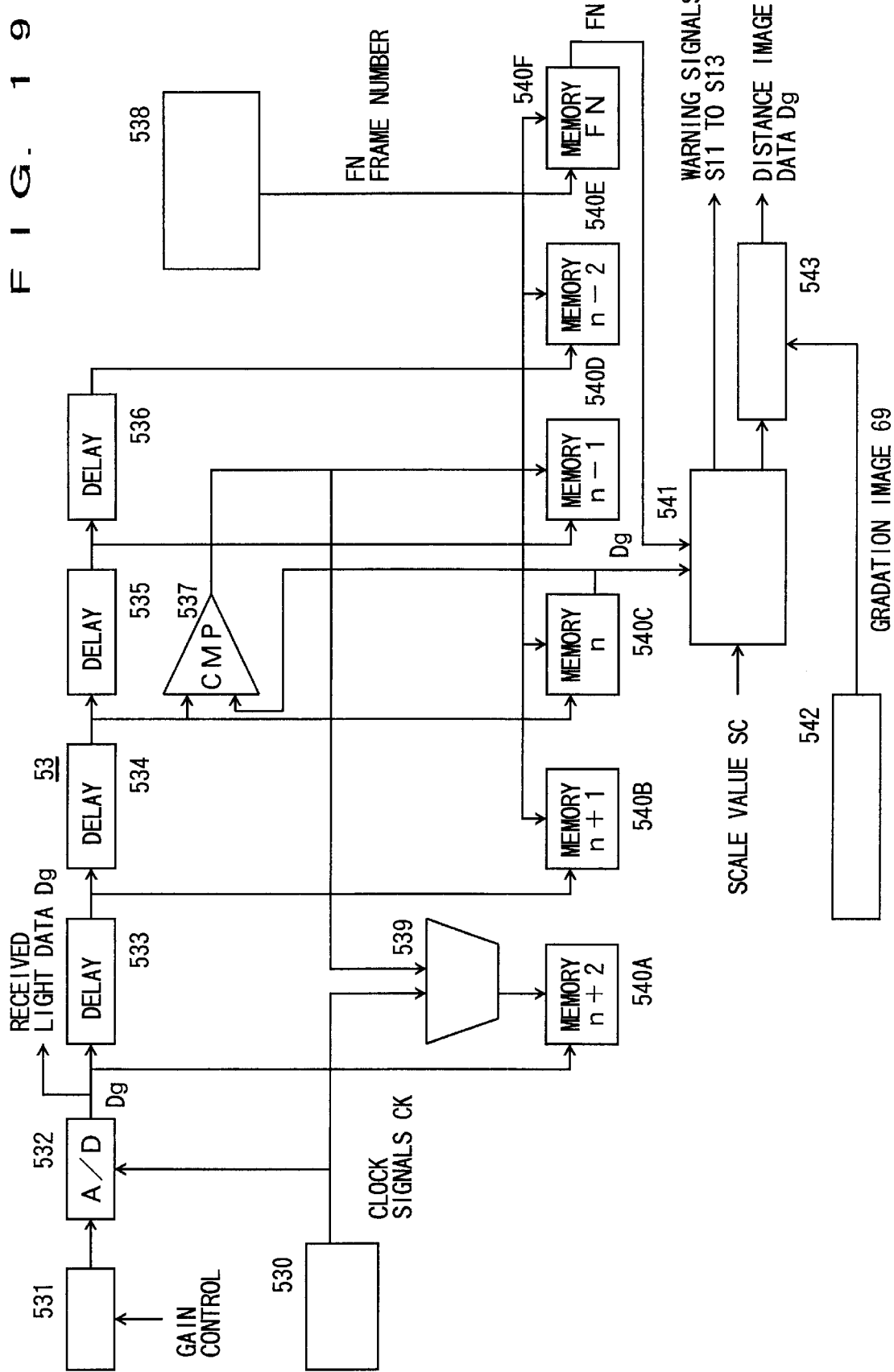

F I G. 2 1
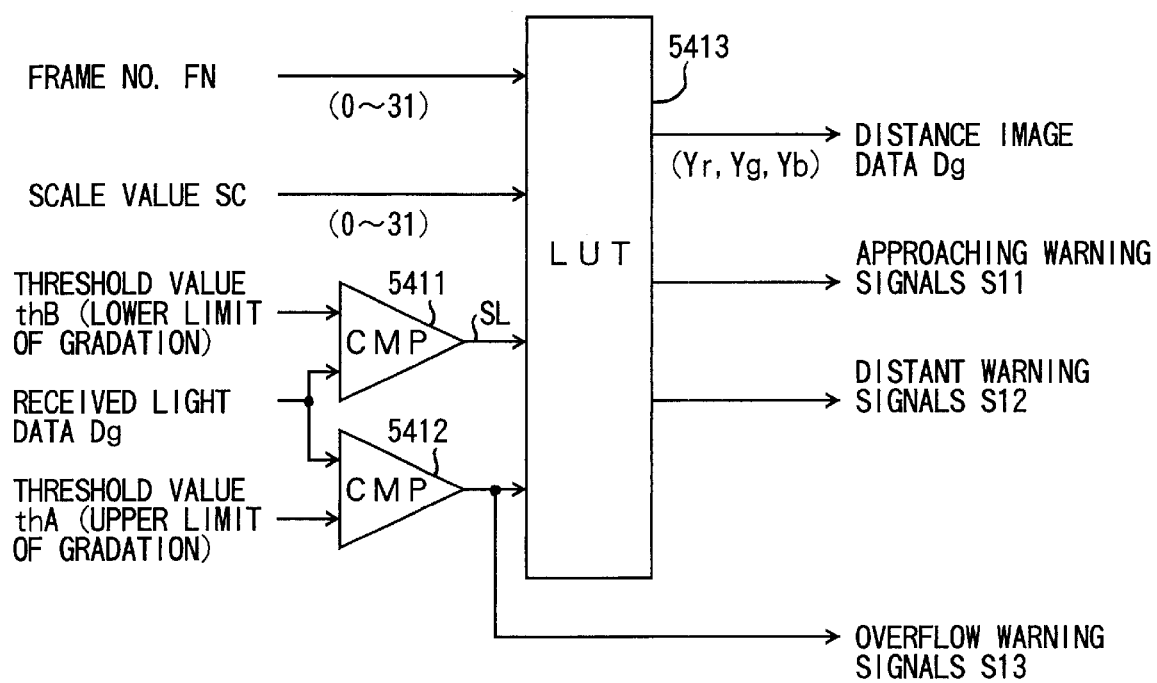

F I G. 2 2

| INPUT | | | OUTPUT | | |
|---|---|---|---|---|---|
| LOW BRIGHTNESS | OVERFLOW | DISTANCE CONDITIONS | DISPLAY COLOR | NEAR | DISTANT |
| OFF | OFF | FN-SC+16 ≤ 0 | BLUE | OFF | ON |
| | | 0<FN-SC+16 ≤ 15 | GRAY SCALE | OFF | OFF |
| | | FN-SC+16=16 | CYAN | OFF | OFF |
| | | 16<FN-SC+16 ≤ 30 | GRAY SCALE | OFF | OFF |
| | | 30<FN-SC+16 | GREEN | ON | OFF |
| | ON | (OVERFLOW) | RED | OFF | OFF |
| ON | -- | (LOW BRIGHTNESS) | BLACK | OFF | OFF |

IMAGING SURFACE S2

SLIT IMAGE

IMAGING SURFACE S2

SLIT IMAGE

IMAGING SURFACE S2

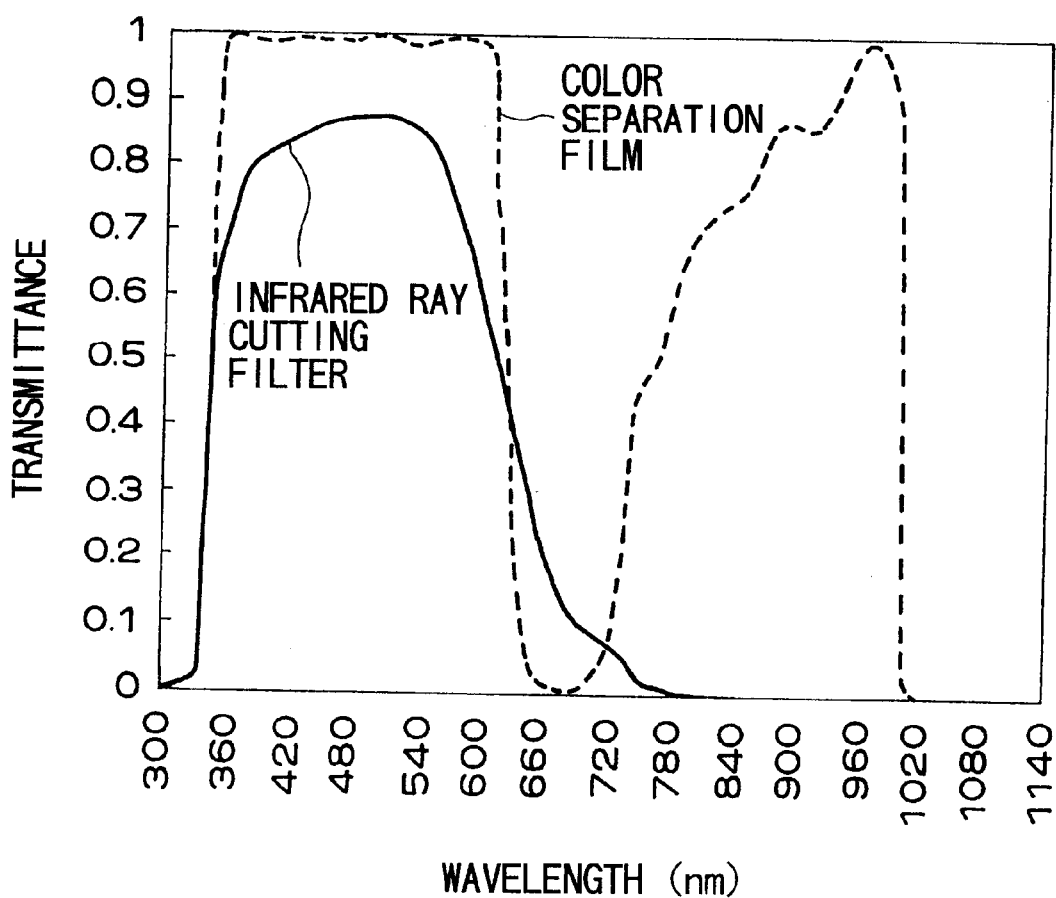

APPARATUS FOR MEASURING THREE-DIMENSIONAL SHAPE

This application is based on Japanese Patent Application No. 2000-97241 filed on Mar. 31, 2000, the contents of which are hereby incorporated by reference.

BACKGROUND OF THE INVENTION

1. Field of the Invention

The present invention relates to an apparatus for measuring a three-dimensional shape of an object by irradiating light such as a slit light to the object, comprising obtaining both of measured data to be used for three-dimensional measurement of the object and two-dimensional image data of the object.

2. Description of the Prior Art

A non-contact type three-dimensional measuring apparatus is often utilized for inputting data to CG system or CAD system, anthropometry, visual recognition of robots and so on since the non-contact type three-dimensional measuring apparatus can conduct measurements more rapidly than a contact-type measuring apparatus does.

There is known, as the method of the non-contact measurement of an object, a method wherein an object is measured by projecting a specific detection light to an object and receiving reflected light based on the triangulation method. For example, a laser beam is projected on an object from a light source such as a semiconductor laser, and bright spot occurring thereby is captured by a camera from an angle different from that of the light source. Thus, a three-dimensional location is determined by connecting positions of the light source, camera and bright spot to form a triangle.

Spotlight projection method and slit light projection method are known as one of such methods. In the spotlight projection method, a spotlight is projected on an object and the projected spot light is optically and two-dimensionally scanned. In the slit light projection method, a slit light is projected on an object, and the projected slit light is optically and single-dimensionally scanned. The slit light projection method is called also as a light-section method. In the spotlight projection method, there is obtained a spot image whose sectional surface on a imaging surface is a punctiform image. In turn, in the slit light projection method, there is obtained a slit image whose sectional surface is linear is obtained. Three-dimensional image is obtained as a collection of pixels indicating three-dimensional positions of a plurality of parts on the object.

Turning to the drawings, FIGS. 26A to 26D generally illustrate a scheme of the slit light projection method, and FIGS. 27A and 27B generally illustrate the principle of measurement which employs the slit light projection.

A measurement slit light U in the form of a strip having a thin sectional surface is irradiated on an object Q that is an object for measurement. Reflected light is then made incident to, for example, an imaging surface S of a two-dimensional light receiving element (FIG. 26A). If the irradiated part of the object Q is flat, the obtained image (slit image) is linear (FIG. 26B). If the irradiated part is rough, obtained image (slit image) is bent or step-wise (FIG. 26C). Thus, distance between the measuring apparatus and the object Q influences a position of the incidence of the reflected light on the imaging surface S (FIG. 26D). Sampling of three-dimensional position of an object is realized by deflecting the measurement slit light U in the widthwise direction and scanning part of a surface of the object which is visible from the light-receiving side. Number of sampling points depends on number of pixels of an image sensor.

In FIGS. 27A and 27B, a light projection system and a light receiving system are so arranged that a base line AS connecting a start point A of light projection with an imaging surface S of the light receiving system is perpendicular with respect to a light receiving axis. The light receiving axis is perpendicular to the imaging surface S, and an intersection S0 of the light receiving axis and the imaging surface S is set as an original position of three-dimensional rectangular coordinate system. Z axis is the light receiving axis, Y axis is the baseline AS and X axis is the longitudinal direction of the slit light.

HH' denotes distance between a front principal point H and a rear principal point H' of a light receiving lens, and b denotes a distance between the point S0 and the rear principal point H'.

The distance b is a so-called image distance. The image distance b is a distance from the rear principal point H' of the lens to the imaging surface S when an image of an object at a finite position is formed on the imaging surface S. The image distance b depends on relationship between a focal length of the light receiving lens and a feed amount of the lens for focusing.

In the case of setting as projection angle θa the angle at which the light projection axis intersects a light projection reference surface (a light projection surface parallel to the light receiving axis) when a point (X, Y, Z) on the object is irradiated with the measurement slit light U, and setting as light receiving angle θp the angle at which a line connecting the point P with the front principal point H intersects a plane (light receiving axis surface) containing the light receiving axis, coordinate Z of the point P is represented by the following equation:

$$L = L1 + L2$$
$$= Z\tan\theta a + (Z - HH' - b)\tan\theta p.$$
$$\therefore Z = (L + (HH' + b)\tan\theta p)/\{\tan\theta a + \tan\theta p\}$$

When setting the light receiving position of the point P as P' (xp, yp, 0) (see FIG. 27A), and imaging magnification of the light receiving lens as coordinates of the point P are:

$$X = xp/\beta$$

$$Y = yp/\beta$$

In the above equations, the baseline L is determined by the locations of the light projection system and the light receiving system and, therefore, has a predetermined value. The light receiving angle θp can be calculated from the relationship of tanθp=b/yp. The imaging magnification of the light receiving lens is calculated from β=−b/(Z−HH'−b).

Thus, after obtaining the distance between the principal points HH', the image distance b and the projection angle θa, it is possible to determine the three-dimensional position of the point P by measuring the position P' (xp, yp) on the imaging surface S. The distance HH' between the front principal point and the rear principal point and the image distance b are determined by relative positional relationship of the lenses comprised in the light receiving system.

In the three-dimensional measuring apparatus comprising a light receiving lens system having a fixed focal length and fixed focus, i.e., in the three-dimensional apparatus which can achieve measurement only when the light receiving lens and an object have a sole predetermined distance relationship, distances between the lenses and the imaging surface S are fixed. Fixed values of the distance HH' and the image distance b can be input into such three-dimensional measuring apparatus in advance of the measurement.

On the other hand, in a three-dimensional measuring apparatus capable of changing distance relationship between a light receiving system and an object, it is necessary to move a part or whole part of lenses comprised in the light receiving system about its light receiving axis for focusing. Further, a three-dimensional measuring apparatus capable of varying an angle of view of a light receiving system typically has a zooming mechanism. According to such zooming mechanism, it is possible to change focal length of a lens by moving a part or whole part of the lenses about a light receiving axis.

In the above mentioned cases, it is possible to detect relative positions of lenses and to obtain the distance HH' between the front principal point and the rear principal point and the image distance b from a table memorized in advance of measurement by a potentiometer (position sensor) for detecting positions of the lenses or, if the automatic lens drive is employed, an encoder associated with a motor in order to detect.

The light projection angle θa is changeable depending on a deflected angle of the measurement slit light U. In the case of using a three-dimensional measuring apparatus comprising a galvanomirror for deflection, the light projection angle θa is calculated by employing a known method of recognizing the deflected angle of the measurement slit light U in a capturing process by synchronously controlling a imaging timing of light receiving element, an angle for starting rotation of the galvanomirror and a rotational angular speed of the galvanomirror.

In the case of three-dimensional measurement based on the above mentioned principles, a user, as a measurer, decides position and deflection of the three-dimensional measuring apparatus and changing an angle of view of the light receiving lens as required in order to set a capturing area (scanning area) of the object Q.

The angle of view can be changed by using a zoom lens as the light receiving lens, or by exchanging the light receiving lens with a lens having a different focal length.

To facilitate the above-described framing operation, a monitor image of the object Q obtained by photographing the object Q at the same angle of view as that of the scanning area is useful.

For example, in the three-dimensional CG (three-dimensional computer graphics), two-dimensional image data indicating color information of the object Q are required along with three-dimensional data indicating shape of the object Q in many cases.

U.S. Pat. No. 6,141,105 has proposed a method wherein a color separation into a plurality of optical paths using a beam splitter is performed by a light receiving optical system to obtain both of the three-dimensional data and two-dimensional image data.

FIG. 28 is a schematic view showing a light receiving optical system using a beam splitter 70 for color separation. FIG. 29 is a graph showing a light receiving wavelength of a light receiving element 71. FIG. 30 is a graph showing a light receiving wavelength of a light receiving element 72 for monitoring.

The beam splitter 70 comprises a color separation film (dichroic mirror) 701, a pair of prisms 702 and 703 sandwiching the color separation film 701, a visible ray cutting filter 705 placed at a front side of the light receiving element 71, an infrared ray cutting filter 704 placed at an emission surface of the prism 703 and low pass filters 707 and 708.

Light (light beams) UC incident from a light receiving lens then enters into the color separation filter 701 through the low pass filter 707 and the prism 702.

Light U0 in an oscillation band of a semiconductor laser is reflected at the color separation film 701 and then subjected to a total reflection at the incident surface of the prism 702, followed by projection thereof from the emission surface to the light receiving element 71. Among the light U0 projected from the prism 702, light beams that transmit the infrared ray cutting filter 704 and the visible ray cutting filter 705 are then received by the light receiving element 71. In turn, light C0 that transmits the color separation filter 701 is then projected to the light receiving element 72 through the prism 703 from the emission side thereof. Among the light C0 projected from the prism 703, light beams that transmit the infrared cutting filter 706 and the low pass filter 708 are received by the light receiving element 72.

Referring to FIG. 29, the color separation filter 701 reflects a light having a relatively wide bandwidth that contains a wavelength of a slit light (λ: 690 nm) as indicated by the broken line. Thus, wavelength selectivity of the color separation filter 701 is not satisfactory from the viewpoint of selectivity for making only the slit light incident to the light receiving element 71. However, in the beam splitter 70, a light ultimately enters into the light receiving element 71 is the light having a narrow bandwidth as indicated by virgules in FIG. 29 due to the infrared ray cutting filter 704 having the characteristics indicated by chain line and the visible ray cutting filter 705 having the characteristics indicated by continuous line.

In turn, only visible light enters into the light receiving element 72 since the infrared rays transmitting the color separation film 701 having the characteristics indicated by broken line are cut off by the infrared ray cutting filter 708 having the characteristics indicated by continuous line in FIG. 30.

In the conventional method of performing color separation using a plurality of light receiving elements and a beam splitter, relative positional relationship between the light receiving elements is so important that adjustment for the relative positions among the light receiving elements requires user's cautiousness and, thus, the adjustment operation is troublesome. Further, it is necessary to prevent the relative positions from changes due to vibration or shock even after the adjustment, so that the production and adjustment entails troubles.

In addition, a high-precision beam splitter is expensive. Production cost of a three-dimensional measuring apparatus having such high-precision beam splitter is increased in combination with the need for a plurality of light receiving elements and control drivers. Color CCD is typically used as light receiving element in the case of obtaining a color image by using the light receiving element; however, as shown in FIG. 30, a wavelength of the light enters into the light receiving element 72 is limited to 650 nm or less in the visible area thereby deteriorating color reproduction of red.

To overcome the above problems, there has been proposed a method wherein an RGB rotational filter having a transmittance shown in FIGS. 14B, 14C and 14D is used as a light receiving optical system for obtaining both of three-dimensional data and two-dimensional image data. According to the method, it is possible to reduce the production cost and obtain images free from positional differences of pixels.

However, in the above method, SIN is deteriorated since the RGB rotational filter is used for obtaining two-dimensional color image data and also for obtaining three-dimensional data.

For example, in the case of using a red color laser as a light source for emitting a light from a light projection system, projected light is reflected at an object and transmits an R filter to reach the light receiving element as mentioned above. The three-dimensional data are calculated from output signals of the light receiving element, and components of the output signals other than the reflected light of the projected light become noise which must be eliminated. However, in this method, the R filter used for obtaining the two-dimensional image data has a transmittance shown in FIG. 14B, and, in the case where wavelength of a semiconductor laser beam is 690 nm, the R filter transmits unnecessary light beams to thereby create an error factor in calculating the three-dimensional data.

SUMMARY OF THE INVENTION

An object of the present invention is to provide a three-dimensional shape measuring apparatus which can obtain both of three-dimensional data and two-dimensional image data in a three-dimensional measurement, wherein the three-dimensional data and the two-dimensional image data have no positional difference and scarcely have noises created by unnecessary wavelengths.

According to one aspect of the present invention, a three-dimensional shape measuring apparatus comprises a light projector for projecting light to an object, a light receiving element, a light receiving optical system for leading light projected on and then reflected by the object to the light receiving element, the light receiving optical system including a first optical filter which transmits only light having substantially the same range of wavelengths as that of the light projected from the light projector, at least one second optical filter which transmits light having a different range of wavelengths as that of the first optical filter and a filter selector which selectively locates one of the first optical filter or the second filter or filters at an optical path of the light receiving optical system, and a calculator for obtaining measured data for three-dimensional shape measurement based on signals output from the light receiving element.

Preferably, the second optical filter may include three optical filters for transmitting wavelengths of colors of red, green and blue in order to obtain a two-dimensional image of the object.

The second optical filter may include three optical filters for transmitting wavelengths of stimuli of X, Y and Z.

These and other objects and characteristics of the present invention will hereinafter be described more in detail by the drawings and preferred embodiments.

BRIEF DESCRIPTION OF THE DRAWING

FIG. 8 shows a positional relationship between the reference light optical system and a light receiving optical system and an example of a direction of irradiation of a reference spotlight.

FIG. 9 shows another example of the direction of irradiation of the reference spotlight.

FIG. 19 is a block diagram showing an output processing circuit.

FIG. 21 is a block diagram showing a warning judgment circuit.

FIG. 22 is a table showing a relationship between input and output of the warning judgment circuit.

FIG. 30 is a graph showing a wavelength of a light receiving element for monitoring.

DESCRIPTION OF THE PREFERRED EMBODIMENTS (General Structure)

Figure 1:
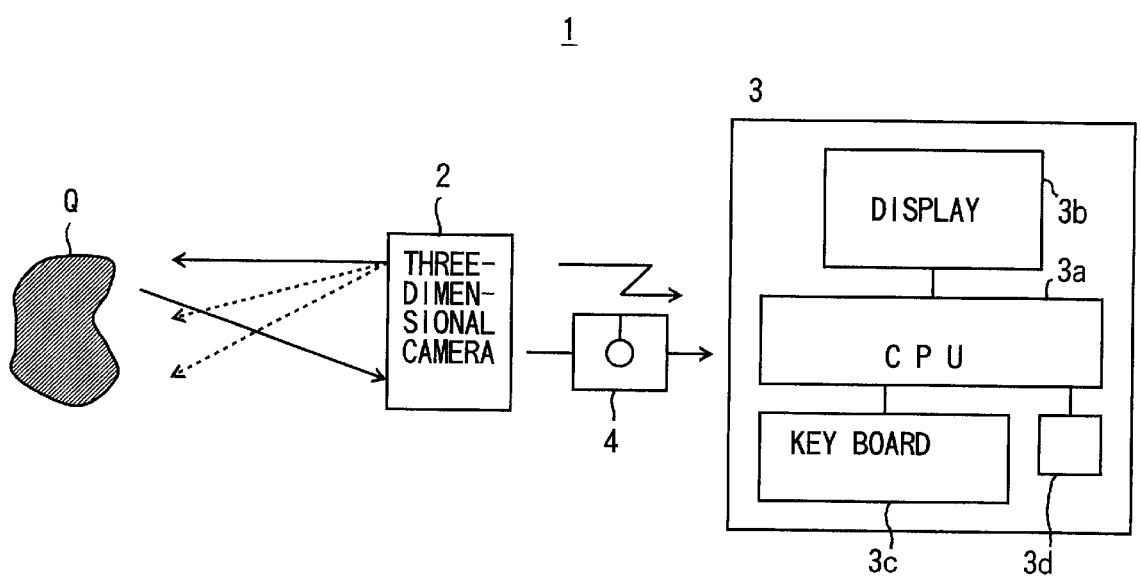
FIG. 1 is a block diagram showing a measuring system of one embodiment of the present invention.

FIG. 1 is a block diagram showing a measurement system 1 of one embodiment of the present invention.

The measurement system 1 comprises a three-dimensional camera 2 for performing three-dimensional measurements by means of the slit light projection method and a host 3 for processing output data of the three-dimensional camera 2. The "three-dimensional camera"

means that a camera which captures images for three-dimensional shape measurements in this specification.

The three-dimensional camera 2 outputs a two-dimensional image (two-dimensional data) indicating color information of an object Q and data required for calibration as well as measured data (slit image data) for specifying three-dimensional positions of a plurality of sampling points on the object Q. The host 3 serves to perform operation process for determining coordinates of the sampling points using the triangulation method.

The host 3 is a computer system comprising a CPU 3, a display 3b, a key board 3c, a mouse 3d and the like. Software for processing the measured data is incorporated into the CPU 3a. It is possible to communicate data between the host 3 and the three-dimensional camera 2 by way of an on-line transmission and an off-line transmission using a portable recording medium 4. Examples of the recording medium 4 include a magneto-optic disk (MO), a mini disk (MD), a memory card and the like.

(Structure of Three-dimensional Camera)

Figure 2A:
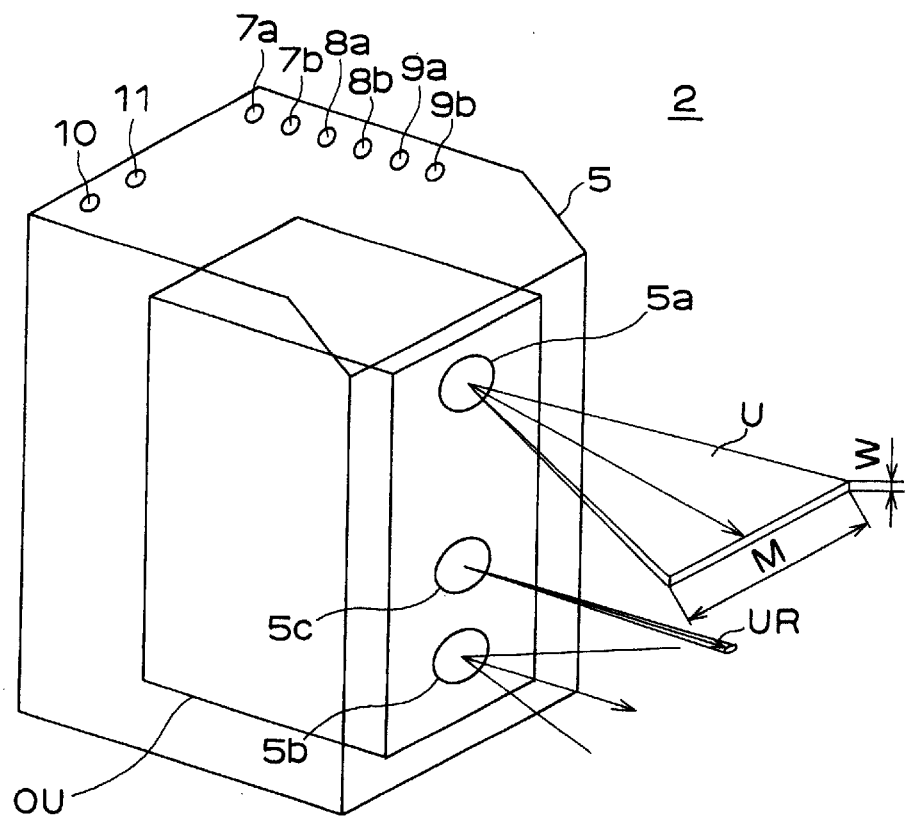
FIGS. 2A and 2B generally show an appearance of a three-dimensional camera.
Figure 2B:
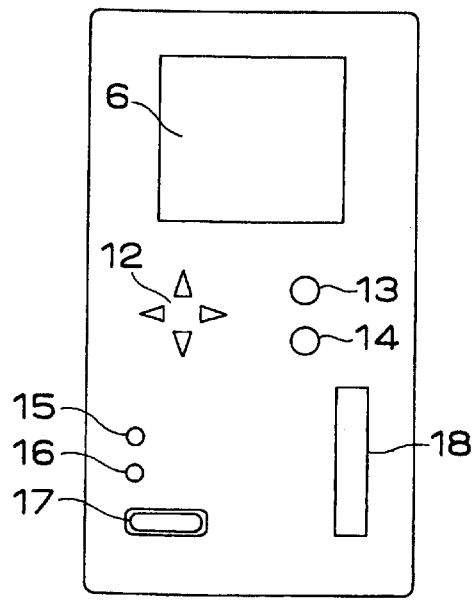

FIGS. 2A and 2B generally show an appearance of the three-dimensional camera. FIG. 2A and FIG. 2B respectively are a perspective view and a plan view of an operation panel provided at a rear side of the three-dimensional camera.

In a front face of a housing 5, there are provided a light projection window 5a, a light receiving window 5b and a reference light window 5c. A measurement slit light U (laser beams in the form of a strip having predetermined width w) projected from an internal optical unit OU goes toward the object Q, which is an object for measurement, through the light projection window 5a.

The reference spotlight UP projected by the internal optical unit OU goes toward the object Q through the reference light window 5c.

Measurement slit light (measurement light beams) U and a part of the reference spotlight (reference light beams) UR reflected at a surface of the object Q enter into the optical unit OU through the light receiving window 5b.

On an upper face of the housing 5, there are provided a zooming buttons 7a and 7b, focusing switching buttons 8a and 8b, manual focusing buttons 9a and 9b, a start button 10 and a reference light projection button 11. As shown in FIG. 2B, there are provided, on a rear face of the housing 5, a liquid crystal display 6, a cursor button 12, a select button 13, a record button 14, analogue output terminals 15 and 16, a digital output terminal 17 and an inlet 18 for the recording medium 4. The record button 14 is also used as a focusing locking button.

The liquid crystal display 6 is used as a display section of an operation screen and an electronic view finder. A user who takes measurements can set a imaging mode by using the buttons 12 and 13 at the rear face. Measured data is output from the analogue output terminal 15 and two-dimensional image signals are output from the analogue output terminal 16 in, for example, the NTSC format. The digital output terminal 17 may be, for example, a SCSI terminal.

(Control Circuit)

Figure 3:
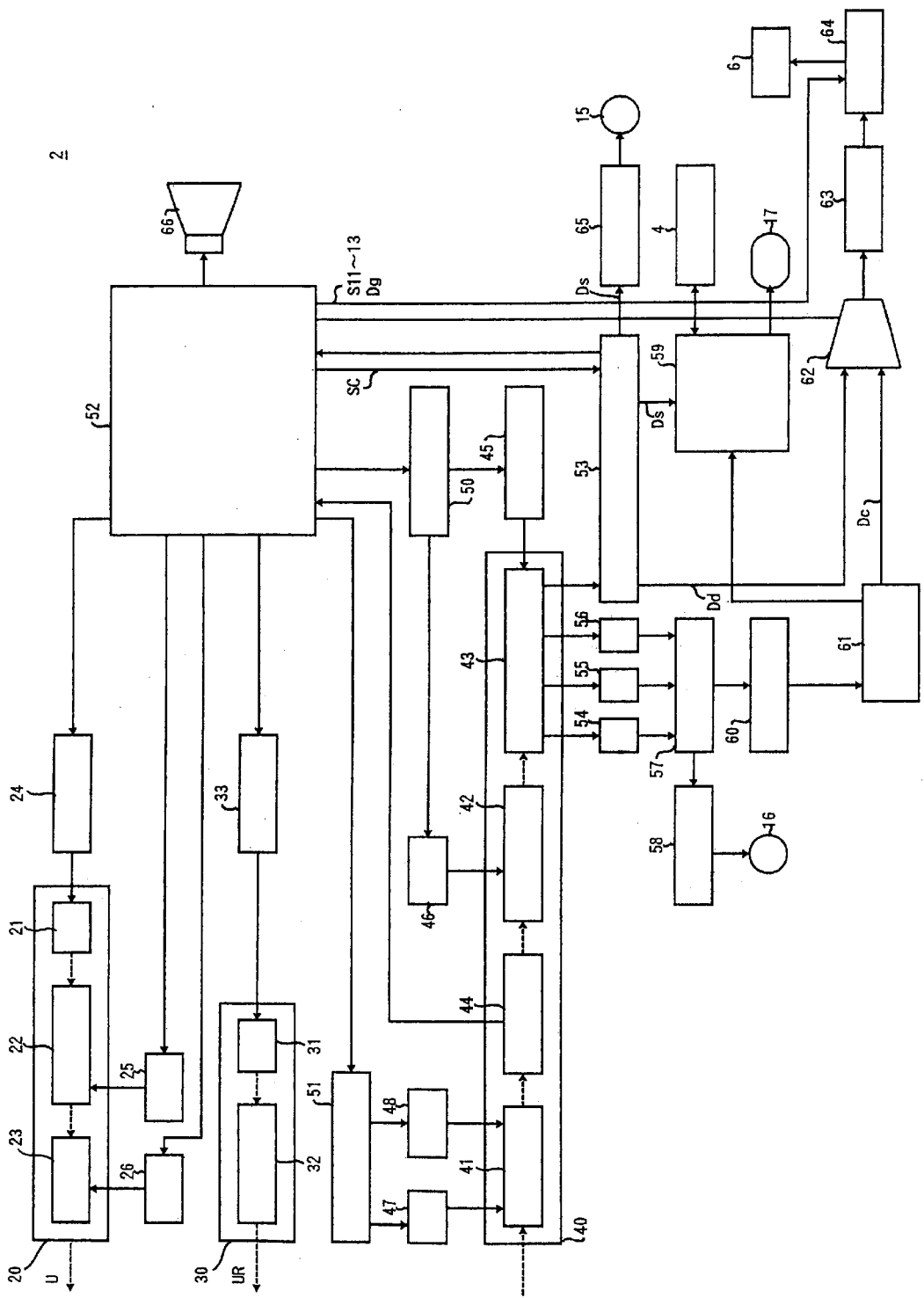
FIG. 3 is a block diagram showing a function of the three-dimensional camera.

FIG. 3 is a block diagram showing a functional structure of the three-dimensional camera 2. An arrow of continuous line in FIG. 3 indicates a flow of electric signals, and an arrow of broken line indicates a flow of light.

The three-dimensional camera 2 has a projection optical system 20, a reference light optical system 30 and a light receiving optical unit 40 comprised in the optical unit OU.

In the projection optical system 20, laser beams projected by a semiconductor laser (LD) 21 having a wavelength of 690 nm becomes a measurement slit light U by passing a light projection system 22 and deflected in the direction perpendicular to the slit light longitudinal direction by means of a galvanomirror used for scanning. A system controller 52 controls a driver 24 of the semiconductor laser 21 and a driving system 25 of the projection lens system 22 and driving system of the galvanomirror.

In the reference light optical system 30, the semiconductor laser (LD) 31 projects laser beams having the same wavelength of the semiconductor laser 21 comprised in the projection optical system 40. Projected laser beams go through the projection lens system 32 and are projected on the object Q as a reference spotlight UR. The system controller 52 controls a driver 33 of the semiconductor laser 31.

In the light receiving optical system 40, light collected by a light receiving lens system 41 generally enters into a light receiving element 43. The light receiving element 43 is a CCD area sensor.

A plurality of lenses having different angles of view (focal length) are provided as the light receiving lens system 41, and a user can so exchange or fit in a light receiving lens system that it has a desired angle of view. A lens detector 44 serves to detect types of lenses Lk of the light receiving lens system currently fitted and to output signals indicating the types to the system controller 52.

A lens controller 51 and a capturing controller 50 control captures operation according to the system controller 52.

Focusing drive is realized by the lens controller 51 and a focusing driving system 47. A zooming driving system 48 is provided for electric zooming in the case of using a zoom lens as the light receiving lens. The driving systems 47 and 48 respectively are controlled by the lens controller 51.

A filter selector 42 comprises four filters, i.e., a band pass filter for transmitting light beams in the oscillating bands of the semiconductor lasers 21 and 31, a red color transmitting filter, green color transmitting filter, and a blue color transmitting filter.

The filter selector is driven by a driving system 46 to perform positioning in a state where any one of the four filters is inserted into an optical path of the light receiving system 41. The capturing controller 50 controls the driving system 46.

The capturing controller 50 controls a driver 45 at the same time with controlling the filter selector 42.

Image information obtained when a light enters into the light receiving element 43 through the band pass filter is sent to an output processor 53, and measured data Ds corresponding to each of pixels of the light receiving element 43 are generated by the output processor circuit 53 to be stored in a memory thereof.

Image information obtained when a light enters into the light receiving element 43 through the red color transmitting filter, the green color transmitting filter or the blue color transmitting filter is then subjected to an image synthesis and color processing at a color processing circuit 57 after being respectively sent to a red color image processing circuit 54, a green color image processing circuit 55 or a blue color image processing circuit 56.

Image information subjected to the color processing is then subjected to an on-line output via a NTSC conversion circuit 58 and the analogue output terminal 16 or quantized by a digital image generation section 60 to be stored at a color image memory 61.

The output processing circuit 53 generates distance image data Dd indicating a measurement result based on the measured data Ds and outputs the distance image data Dd to a multiplexer 62. The multiplexer 62 selects one of two inputs of the distance image data Dd and color image data DC sent from the color image memory 61 according to the system controller 52 and output the selected data.

The data selected by the multiplexer 62 are then sent for a character generator 64 as analogue monitor display signals via a D/A converter 63. The character generator 64 synthesizes an image indicated by the monitor display signals and a letter or a symbol directed by the system controller 52 in order to input the synthesized image to the liquid crystal display 6.

If a user operates the record button 14 to direct a data output (image recording), the measured data Ds in the output processing circuit 53 are output via on-line by an SCSI controller 59 or the NTSC conversion circuit 65 in a predetermined format or are stored in the recording medium 4. The analogue output terminal 15 or the digital output terminal 17 is used for the on-line output of the measured data Ds. Further, the color image data Dc is sent to the SCSI controller 59 from the color image memory 61 to be output via on-line transmission from the digital output terminal 17 or to be stored in the recording medium with being matched with the measured data Ds.

The color image is utilized as reference information at the time of application processing at the host 3. Examples of the process of using color information include a process of generating a three-dimensional shape model by combining a plurality of pairs of measured data having different camera viewpoints, a process of thinning unnecessary vertexes of a three-dimensional shape model and the like.

The system controller 52 drives a buzzer 66 to generate an operation confirmation sound or a warning sound. Further, the system controller 52 gives a scale for monitor display to the output processing circuit 53. The output processing circuit 53 outputs to the system controller 52 three types of warning signals S11 to S13, which are described later in this specification, and received light data which is a part of the measured data Ds.

(Projection Optical System)

Figure 4A:
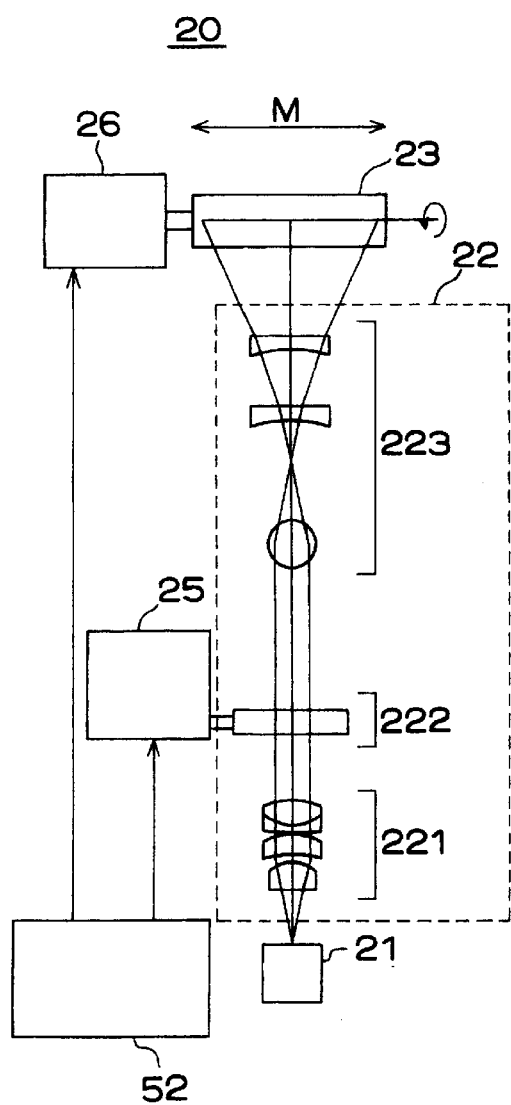
FIGS. 4A and 4B generally show a structure of a projection optical system.
Figure 4B:
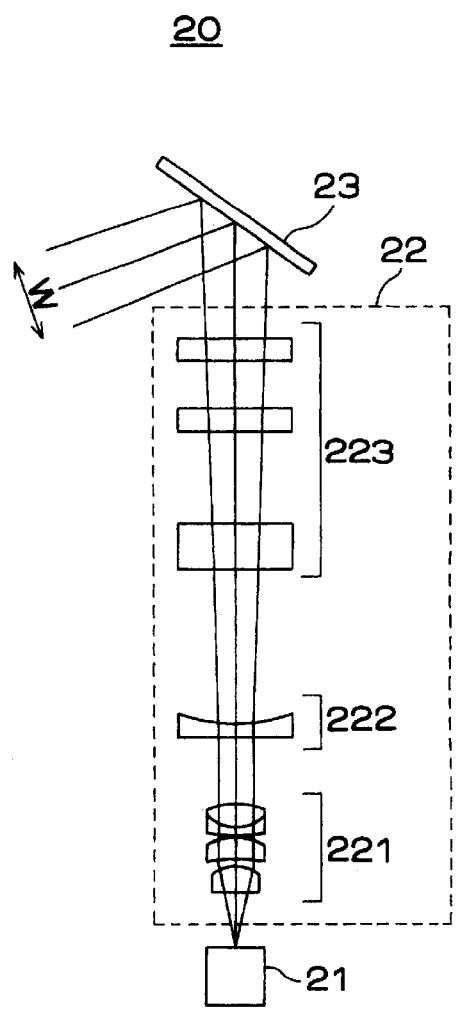

FIGS. 4A and 4B generally show a structure of a projection optical system 20. FIG. 4A is a front elevational view and FIG. 4B is a side elevational view.

An projection lens system 22 comprises collimator lenses 221 including four spherical lenses, variator lens unit 222 including cylindrical lenses having power only in the direction of a slit width of a laser beam, and expander lens unit including three-cylindrical lenses 223 having power only in the longitudinal direction M of a slit.

Optical processing is performed for obtaining a proper measurement slit light U with respect to laser beams projected by the semiconductor laser 21 in the order described below. Beams are made generally parallel to one another using the collimator lenses 221. The variator lens unit 222 adjust the slit widths w of the laser beams. Finally, the expander lenses 223 expand the laser beams in the longitudinal direction M of the slit.

The variator lens unit 222 are provided for making the measurement slit light U each having a width of a three or more (five, in the present embodiment) pixels incident to the light receiving element 43 regardless of a measurement distance and an angle of view of the light receiving optical system 40. Driving system 25 serves to so move the variator lens unit as to maintain a width of the measurement slit light U as constant on the light receiving element 43 according to the system controller 52.

It is possible to reduce distortion of the measurement slit light U by expanding the lengths of the slits before deflection by a scanning system 23 when compared to the case where the expansion is performed after the deflection. It is possible to downsizing the galvanomirror 23 by placing the expander lenses 223 at the final step of the light projection system 22, i.e., by placing the expander lenses nearer to the galvanomirror.

(Reference Light Optical System)

The reference light optical system 30 serves to correct differences of the measured data Ds caused by control difference of the galvanomirror by using data (reference data) obtainable by receiving reflected light of reference spotlight UR projected to the object Q at the light receiving optical system 40.

Figure 5:
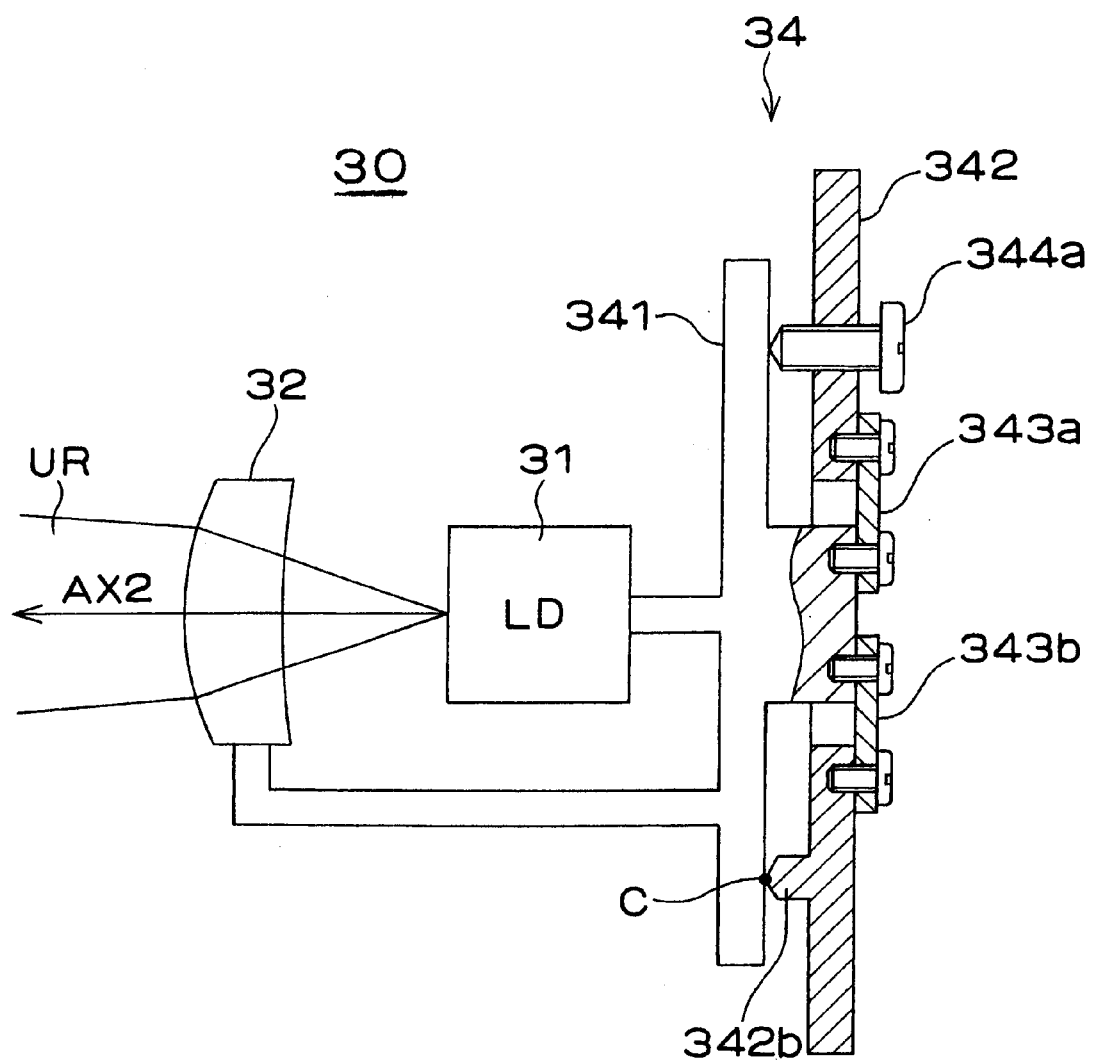
FIG. 5 is a partly sectioned side elevational view schematically showing a structure of a reference light optical system.
Figure 6:
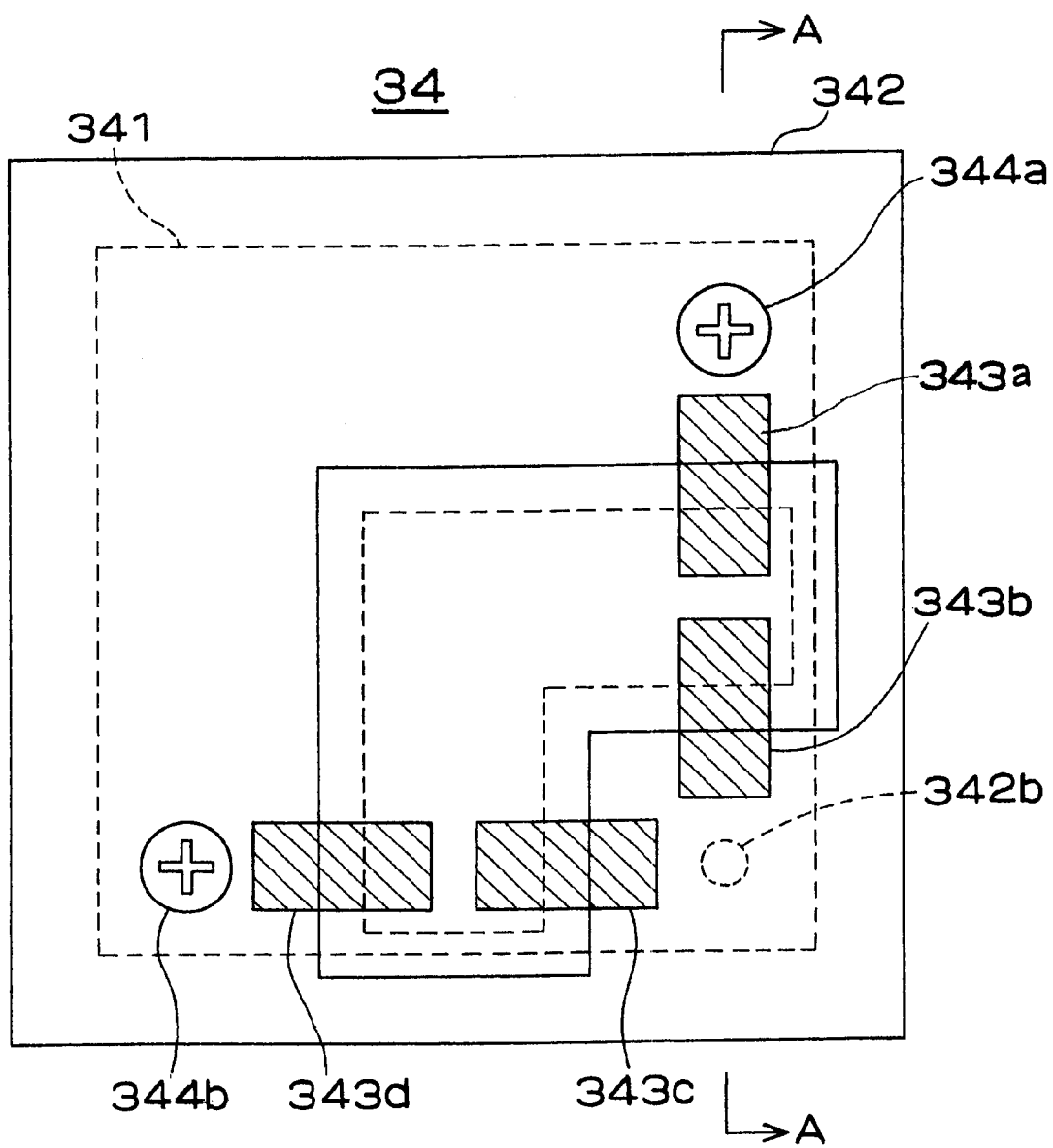
FIG. 6 is a rear elevational view showing schematically a structure of the reference light optical system.
Figure 7:
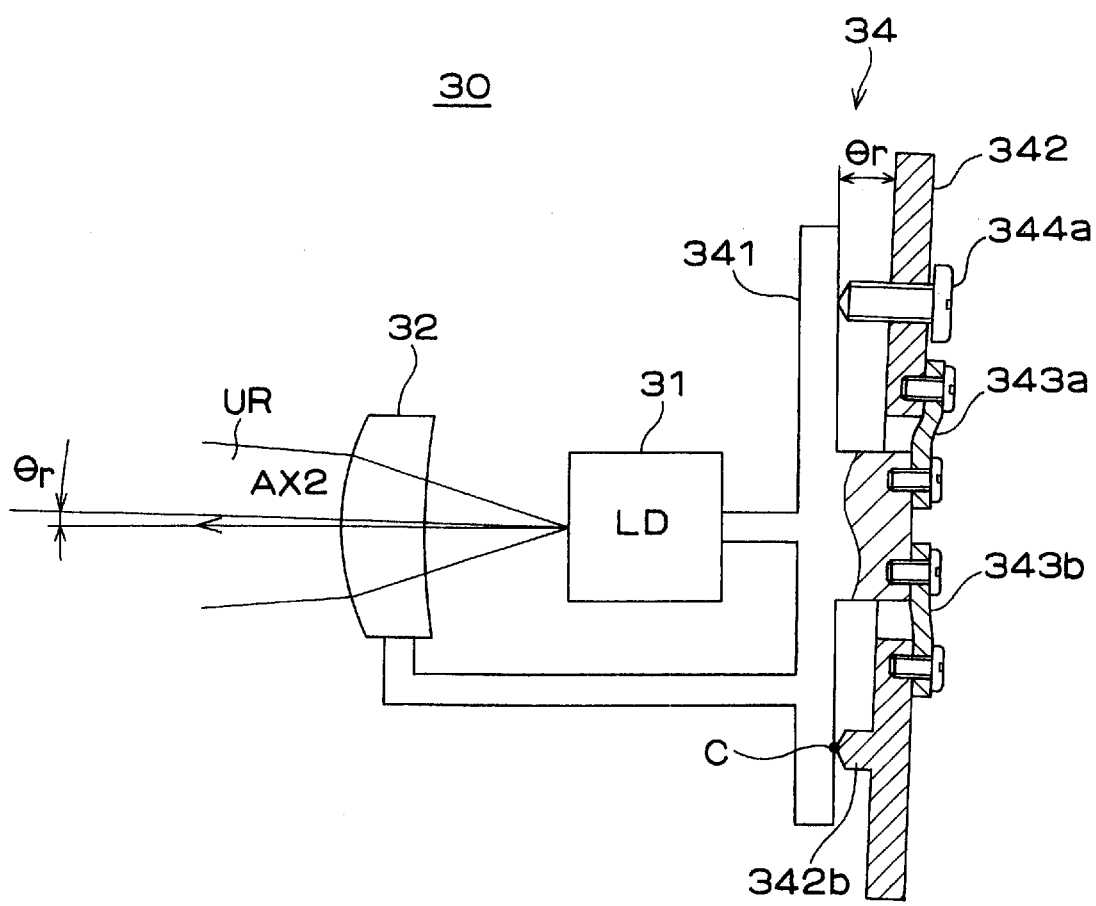
FIG. 7 is a partly sectioned side elevational view schematically showing a structure of the reference light optical system.

FIGS. 5 and 7 are partly sectioned side elevational views showing a structure of the reference light optical system 30. FIG. 6 is a rear elevational view showing a structure of the reference light optical system 30. Sectional position in FIG. 5 is a position of — in FIG. 6. Shown in FIG. 7 is the reference light optical system wherein an angle adjusting screw 344a is screwed.

The reference light optical system 30 comprises a semiconductor laser 31, a projection lens system 32 and a projection angle adjusting mechanism 34.

Reference spotlight UR is projected by the projection lens system 32 with respect to a laser beam projected by the semiconductor laser 31. Beam spot diameter of the laser beam is so set that the reference spotlight UR having three or more pixels is projected on the light receiving element 43 irrespective of the measurement distance and angle of view of the light receiving system 40.

A light projection angle adjustment mechanism 34 serves to precisely adjust orientation of an projection direction AX2 and comprises a retention plate 341, a body support plate 342, angle adjustment plate springs 343a to 343d and angle adjustment screws 344a and 344b.

The body support plate 342 is mounted on a bracket 401 (see FIG. 16) to be described below. The retention plate 341 is mounted on the body support plate 342 by way of the angle adjustment plate springs 343a to 343d. Specifically, the angle adjustment plate springs 343a to 343d are placed, of two each, at positions at right angles to each other with the projection 342b being at the center thereof and fixed by screws on the retention plate 341 and the body support plate 342. The semiconductor laser 31 and the projection lens system 32 are mounted on the retention plate 341.

The body support plate 342 is provided with the projection 342b and the angle adjustment screws 344a and 344b, and tips of the projection 342b and the angle adjustment screw 344a and 344b are abut to the surface of the retention plate 341. By adjusting amount of screw of the angle adjustment screws 344a and 344b, posture of the retention plate 341 is changed with a tip C of the projection 342b being as a point of support, thereby deflecting the angle adjustment plate springs 343a to 343d. Thus, direction of inclination of the retention plate 341 with respect to the body support plate 342 can be adjusted by respectively adjusting the angle adjustment screws 344a and 344b.

FIG. 5 shows a state wherein the angle adjustment screw 344 is at a reference screw position and the projection direction AX2 and the body support plate 342 forms a right angle.

FIG. 7 shows a state wherein the angle adjustment screw 344a is screwed; the angle adjustment springs 343a and 343b are deflected; the retention plate 341 is inclined by an angle Or; and the projection direction AX2 is inclined by an angle Or.

FIG. 8 shows examples of the positional relationship of the reference light optical system 30 and the light receiving optical system 40 and the projection direction AX2 of the reference spotlight UR. FIG. 9 shows another example of the projection direction of the reference spotlight UR.

Figure 27A:
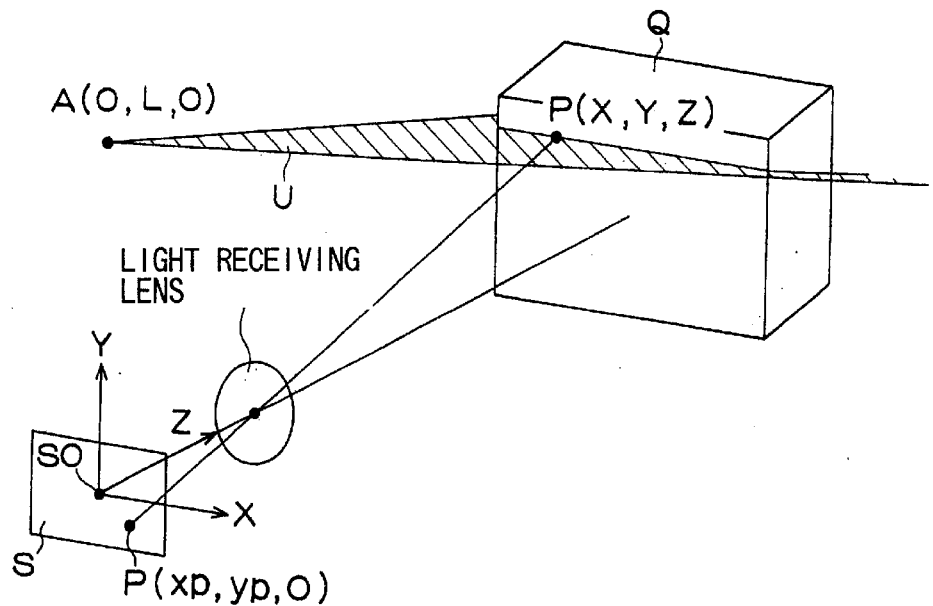
FIGS. 27A and 27B generally illustrate a principle for measurement by the slit light projection method.
Figure 27B:
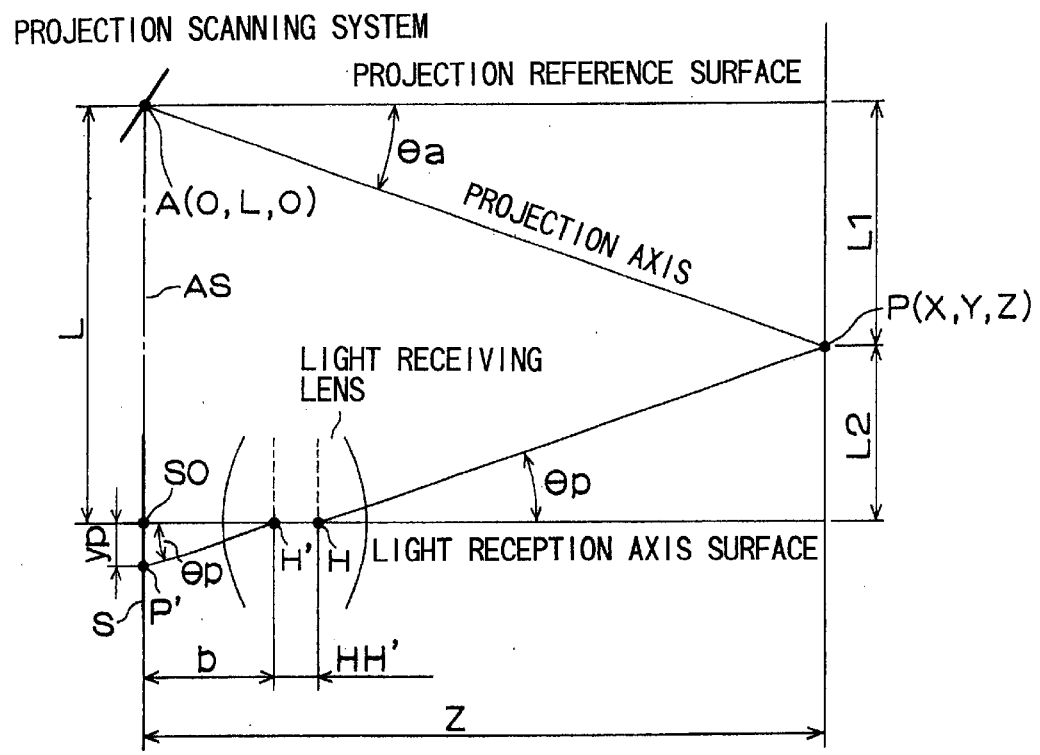
Figure 28:
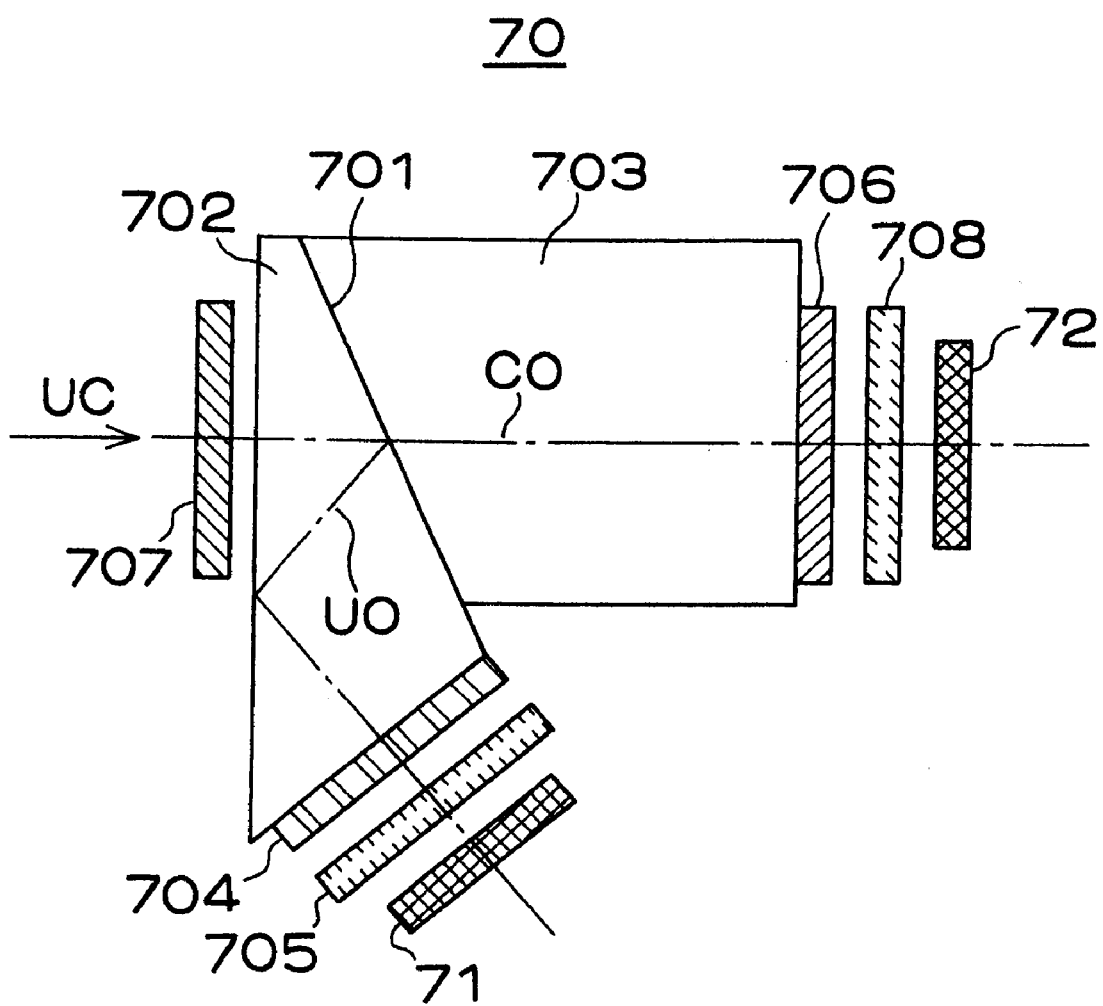
FIG. 28 is a schematic view showing a light receiving optical system using a beam splitter for color separation.
Figure 29:
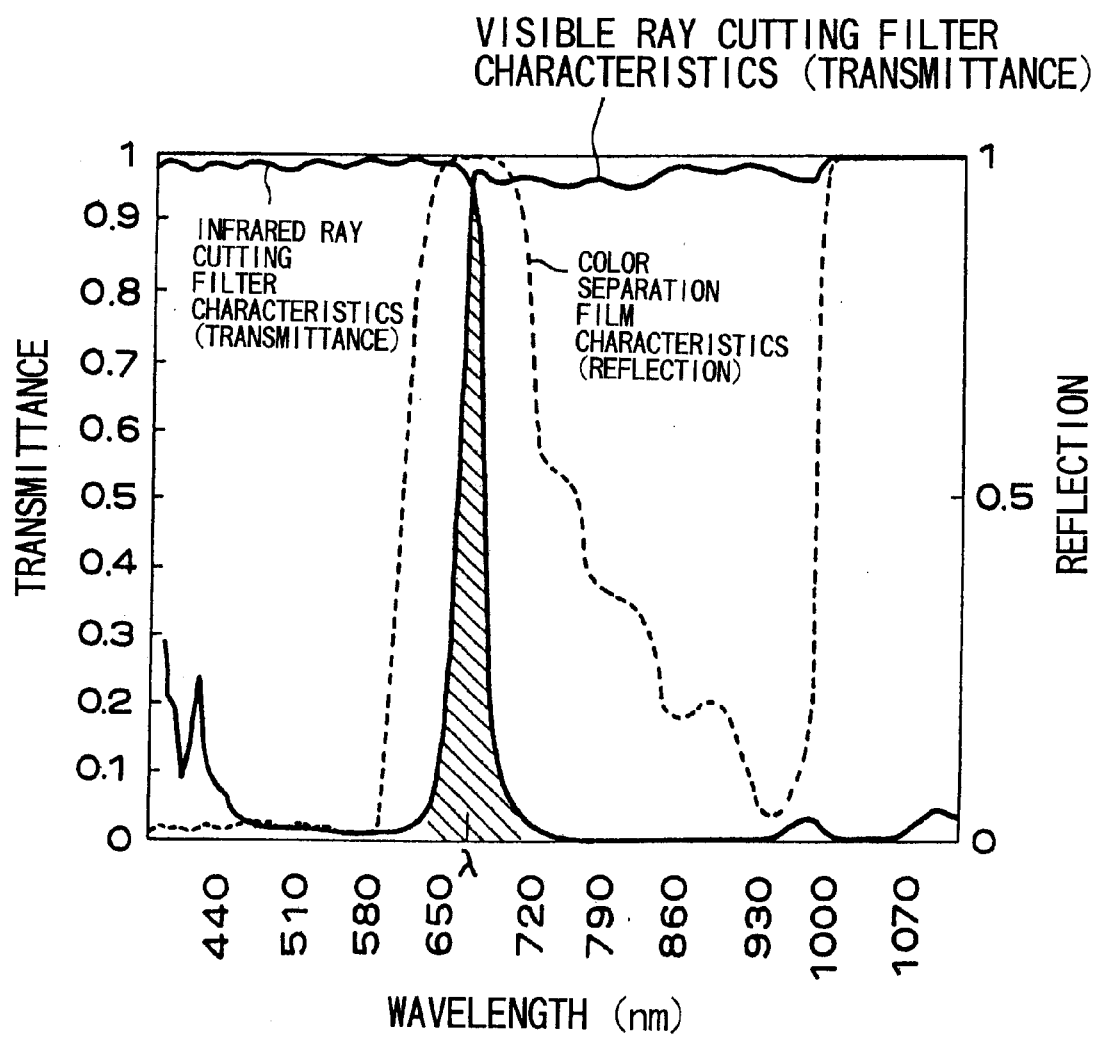
FIG. 29 is a graph showing a wavelength of a light received at a light receiving element for measurement.

A positional relationship of the projection optical system 20 and the light receiving optical system 40 is basically the same as that of known principle illustrated in FIG. 27. Specifically, the projection optical system 20 and the light receiving optical system 40 are so arranged that the baseline AS connecting the starting point A and imaging surface S of the light receiving system is perpendicular to the light receiving axis. The light receiving axis is perpendicular to the imaging surface S, and the intersection S0 of the light receiving axis and the imaging surface S is an original point.

In the present embodiment, a start point R of the reference spotlight UR in the reference light optical system 30 is set between the point S0 as the original point and the start point A of the projection. Specifically, a baseline RS connecting the start point R of the reference spotlight UR and the imaging surface S is perpendicular to a light receiving axis AX3. L3 denotes length of the baseline RS. The projection direction AX2 of the reference spotlight UR is parallel to the light receiving axis AX3.

Principle for correcting errors in the measured data Ds obtained by the reference light optical system 30 will be explained below.

Measurement slit light U projected from the projection optical system 20 is scanned at a projection angle θa depending on input signals SSa to the galvanomirror 23. The input signals SSa and the projection angle θa are in a known relationship, and the relationship is memorized in a proper memory in advance of the measurement. Therefore, the projection angle is usually read out from the memory corresponding to actual input signals and a three-dimensional position is calculated using the read out projection angle θa.

The galvanomirror is susceptible to changes of temperature and humidity; therefore, it is possible that the galvanomirror 23 cause an operational error when the temperature or humidity changes. The operational error in this case means that the projection angle θa with respect to the input signals SSa deviates from the known relationship.

Thus, operational error (θa'−θa) may occur when the projection angle corresponding to the input signals SSa becomes θa'.

Therefore, correction data for correcting the operational error of the galvanomirror 23 is obtained just before the projection optical system 20 performs the three-dimensional measurement.

Referring to FIG. 8, the reference spotlight UR is projected from the reference light optical system 30 on the object Q, and diffused reflected light reflected at the point Pr is received at the point Pr' of the light receiving optical system 40, thus to obtain positional coordinates of the point Pr' (xpr, ypr). In the case where the reference spotlight UR is on the YZ plane, xpr equals to 0.

Distance Z from the three-dimensional measuring apparatus to the point Pr on the object Q is determined by the positional coordinates (xpr, ypr) of the point Pr', the length L3 of the baseline RS and parameters (focal length, positions of principal points, feed amount) of the light receiving lens system 41.

From the distance Z, baseline L and the parameters of the light receiving lens system 41, there is obtained a projection angle Oar at which the measurement slit light U projected from the projection optical system is made incident to the point Pr on the body Q.

From the known relationship between the input signals SSa and the projection angle θa, there is obtained input signals SSar which realizes the projection angle θar.

Here, at this point, the measurement slit light U is actually projected from the projection optical system 20 to perform a three-dimensional measurement.

Y coordinate value (ypr2) of a light receiving point (at the same position as the coordinate X of the point Pr') whose X coordinate value is xpr is selected from the measured data DS when signals input to the galvanomirror 23 become SSar.

Difference (ypr2−ypr) of the Y coordinate value ypr and the Y coordinate value ypr2 is then determined. This difference corresponds to a light receiving positional difference caused by the operational error of the galvanomirror. Accordingly, positional corrections or projection angle corrections corresponding to the positional difference (ypr2−ypr) are performed with respect to the Y coordinate values of all the measured data Ds, and three-dimensional data are calculated by using the corrected measured data Ds.

Correction of the measured data Ds may be carried out following the steps of determining a timing tat2 at which a reflected light of the measurement slit light U passes though the point Pr' on the light receiving element 43, obtaining difference (tat2−tat) between the timing tat2 and a theoretical timing tat (or a projection angle Oat) and correcting the measured data Ds.

Such calculation of correction data and correction process of the measured data Ds are performed at, for example, the output process circuit 53.

A single reference light optical system 30 is used in the above correction methods; however, in the case where a plurality of reference light optical systems 30 is used, the light receiving positional difference is obtained at a plurality of positions making it possible to perform corrections at a plurality of points.

In the case where the plural reference light optical systems 30 are placed on a YZ plane, angular speed difference caused by scanning using the galvanomirror 23 can be detected, thereby making it possible to correct differences of the measured data Ds caused by the angular speed difference.

In the case where the plural reference light optical systems 30 are placed on an XZ plane, light receiving positional differences on a plurality of X coordinate positions can be obtained, thereby making it possible to correct bent or waviness of the measurement slit light U with respect to the X axis.

As shown in FIG. 9, it is preferable to orientate the projection direction AX2 of the reference spotlight UR not in parallel to the light receiving axis AX3, but to the center El of the shortest distance in measurement distance area (intersection of the nearest surface and the light receiving axis AX3). In this case, too, the measured data DS can be corrected by the same principle as described above.

In the case of orientating the projection direction AX2 of the reference spotlight UR to the center E1 of the shortest distance, the object Q that is the object for measurement highly possibly exist in the vicinity of the center E1; therefore obtaining of the correction data of the reference spotlight UR is highly successful. Since a capturing area size at far side is larger than that at the near side, even when the distance from the position of the reference spotlight UR to the center of the capturing area is long, proportion of the distance to the capturing area is relatively small.

Thus, the projection direction AX2 of the reference spotlight UR is satisfactory as long as the reference spotlight UR can be irradiated on the object Q in the capturing area. Preferably, the reference spotlight UR irradiates in the vicinity of the center of the capturing area. However, as is geometrically apparent, it is impossible to irradiate the reference spotlight UR on the center of the capturing area in all the measurement distances.

Figure 10:
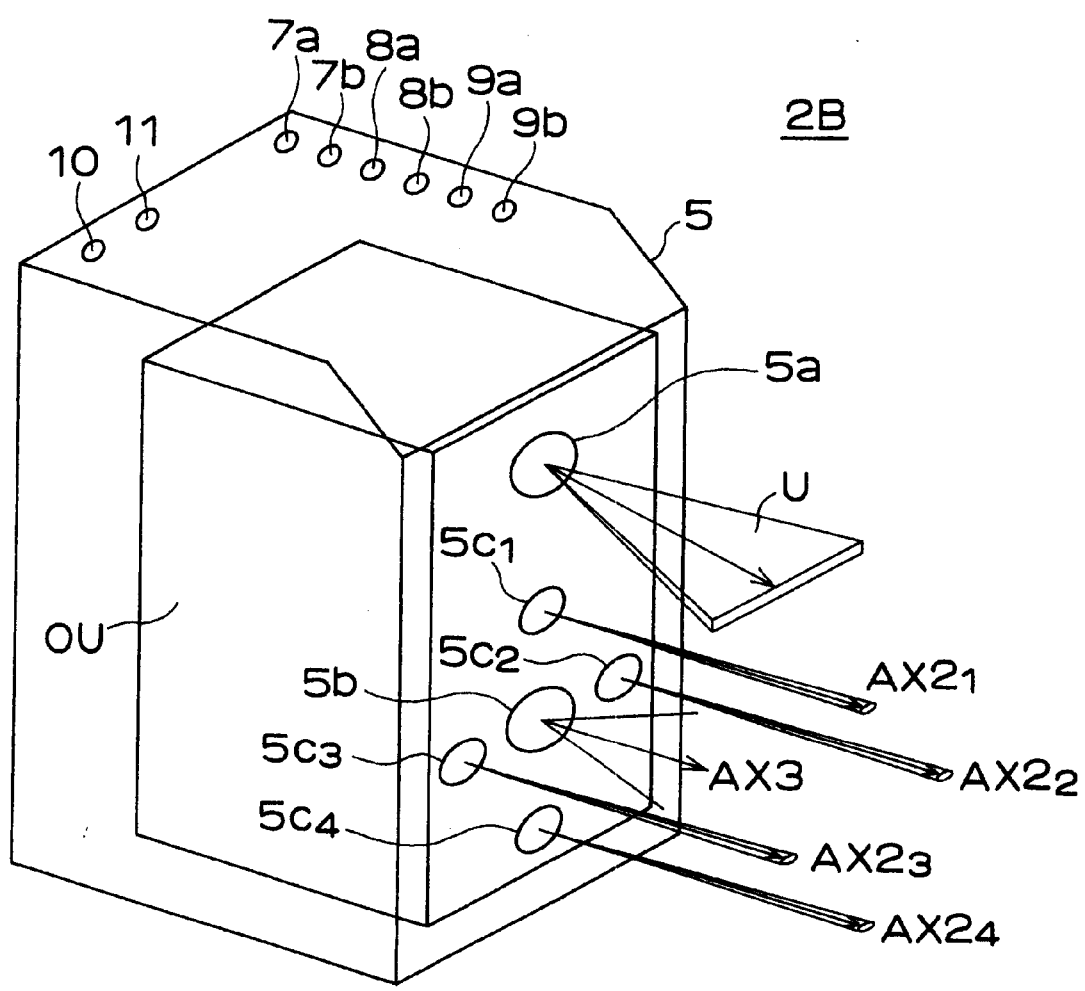
FIG. 10 is a perspective view showing an appearance of a three-dimensional camera provided with a plurality of reference light optical systems.

FIG. 10 is a perspective view showing an appearance of a three-dimensional camera 2B having a plurality of the reference light optical systems.

In the three-dimensional camera 2B shown in FIG. 10, there are provided a light projection window 5a, a light receiving window 5b and four reference windows 5c1 to 5c4 at a front face of a housing 5. Reference spotlight projected from the four reference light optical systems that are provided at an optical unit OU inside the camera is projected on an object through the reference windows 5c1 to 5c4. In the example shown in FIG. 10, the four reference spotlights respectively have projection directions parallel to the light receiving axis AX3.

When positioning the three-dimensional camera 2B and the object Q, it is possible to use the reference spotlight UR projected from any one of the reference light optical systems 30 as a marker to indicate the measurement position. A user has only to decide a position of the object Q to be measured or a position of the three-dimensional camera with watching the reference spotlight UR.

(Light Receiving Optical System)

Figure 11:
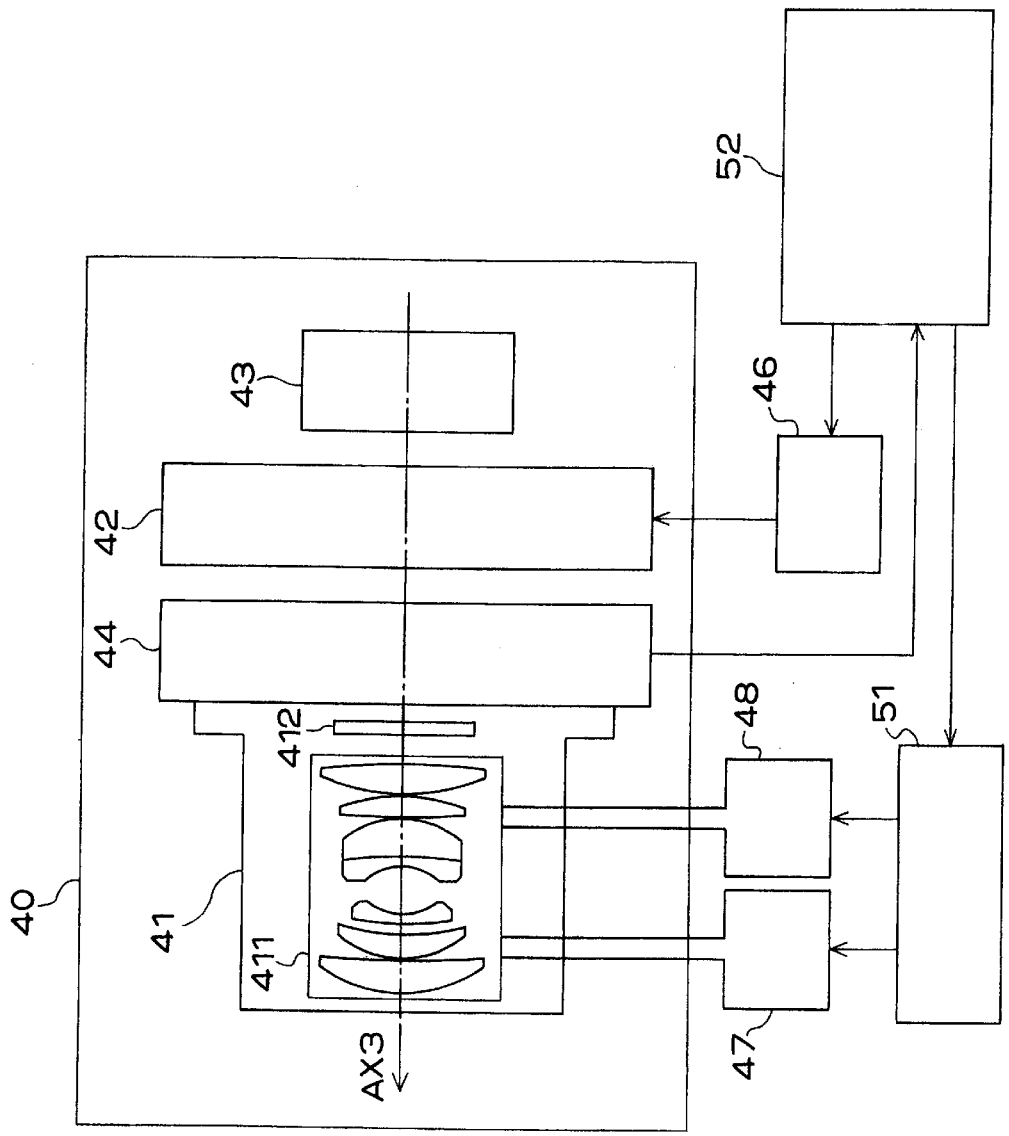
FIG. 11 schematically shows a structure of the light receiving optical system.
Figure 12:
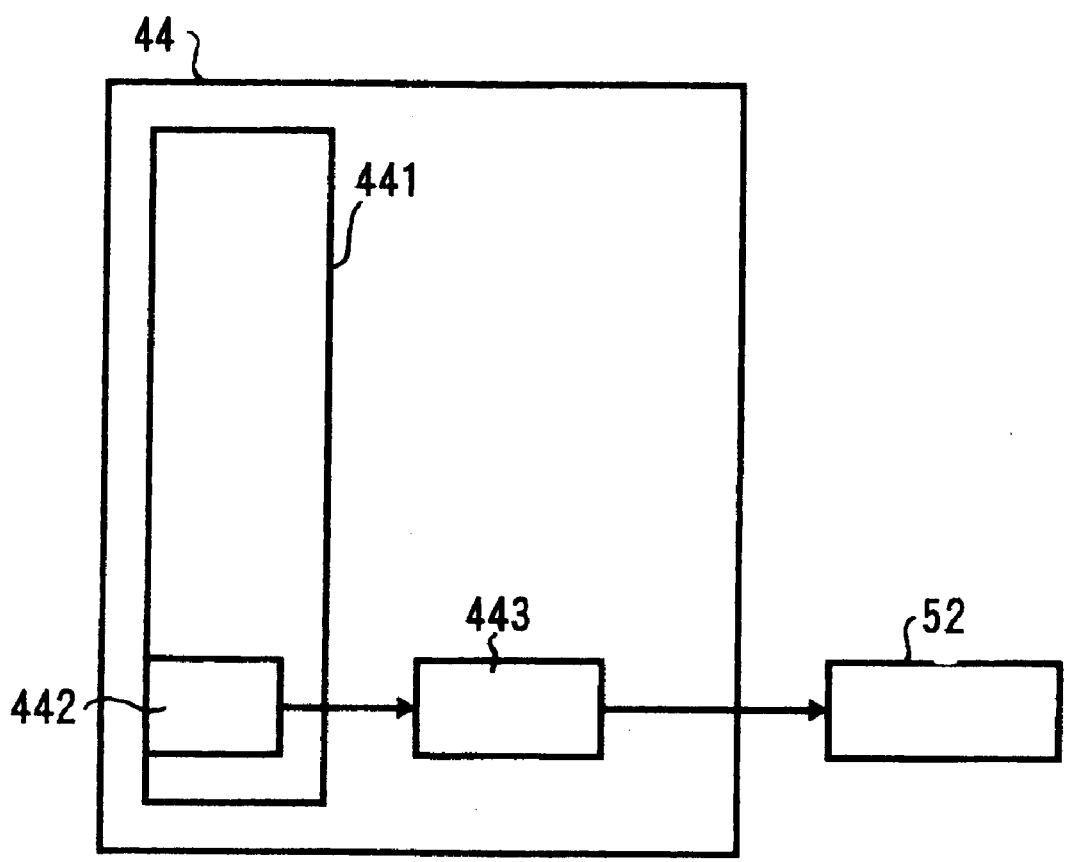
FIG. 12 schematically shows a lens detector.

FIG. 11 schematically shows a structure of the light receiving optical system 40, and FIG. 12 schematically shows the lens detector 44.

Referring to FIG. 11, the light receiving optical system 40 comprises a light receiving lens system 41, a lens detector 44, a filter selector 42 and a light receiving element 43.

The light receiving lens system 41 of the present embodiment comprises a light receiving lens 411 including 7 lenses and a infrared ray cutting filter 412.

Auto-focusing operation for the light receiving lens system 41 is performed by moving the light receiving lens 411 about the direction of the light receiving axis AX3 by means of a driving system 47. The light receiving lens shown in FIG. 11 is a lens having a fixed focal length and, therefore, zooming operation is not performed.

Referring to FIG. 12, the lens detector 44 comprises a lens mount 441, a contact point 442 and a discriminator 443.

The contact point 442 is an electrical contact point or a mechanical contact point. A light receiving lens system 41 is detachably attached to the lens mount 441, and parameters of the attached light receiving lens system 41 such as an f-number, a focal length, a zooming area, a current position of zooming and so on are input into the discriminator 443 via the contact point 442. The discriminator 443 judges if the light receiving lens system is attached or not and outputs the parameters to the system controller 52 when the light receiving lens system is attached.

Thus, the light receiving lens system 41 is exchangeable and, therefore, it is possible to use, according to the present embodiment, a proper light receiving lens system depending on a size of the object Q, a shape of the object Q, distance from the object Q and brightness of the object Q.

Figure 13:
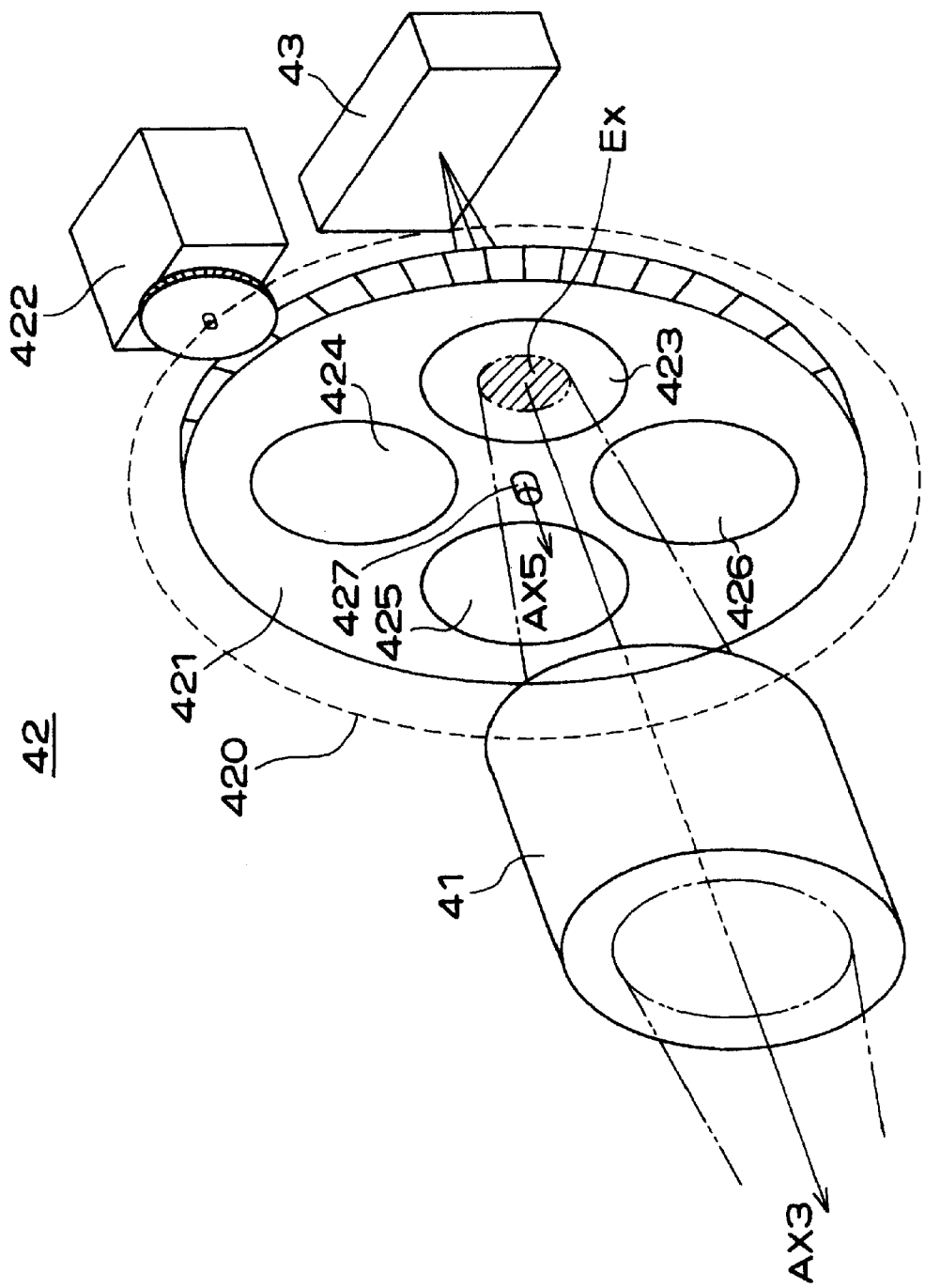
FIG. 13 is a perspective view showing a filter selector.

FIG. 13 is a perspective view showing the filter selector 42.

The filter selector 42 comprises a filter plate 421, a motor 422, a band pass filter 423, a red color transmitting filter 424, a green color transmitting filter 425 and a blue color transmitting filter 426.

The filter plate 421 is comprised of, for example, aluminum alloy, synthetic resin or the like and is in the form of a disc. The filter plate 421 is rotatably attached to the filter selector 42 and rotate about a rotational axis 427 with the center of the axis being the center of the rotation. In the filter plate 421, four holes piercing therethrough are provided, each at every 90 degrees in this embodiment, at rotational angles different to one another with the rotational axis 427 being as the center of the holes. Above-mentioned four filters are inserted into the holes, respectively. A rotational member 420 is thus composed of the filter plate and the four filters.

To insert the filters, each of the holes of the filter plate 421 may be formed to have two sizes of diameters, large diameter and small diameter, so that an outline of each of the filters can be fitted to the large diameter. An adhesive may be used for fixing each of the filters, or each of the filters may be fixed by pressing an outer edge of the filter using a ring-shaped pressing plate and fixing the pressing plate to the filter plate 421 using screws. It is possible to use such pressing plate also as a diaphragm member to be described later in this specification.

A gear is provided at the peripheral surface of the filter plate 421, which stays in mesh with a gear provided at an output shaft of the motor 422. The motor 422 rotationally drives the filter plate 421 via the gears with being controlled by the capturing controller 50 and locate the filter plate 421 at a position where an optical axis of any one of the band pass filter 423, the red color transmitting filter 424, the green color transmitting filter 425 and the blue color transmitting filter 426 agrees with the optical path of the light receiving lens system 41.

The diameter of each of the holes in the filter plate 421 and an effective diameter of each of the filters are so set as to be satisfactorily larger than the largest optical path diameter Ex of the light (light beams) UC, which is made incident to the light receiving lens system 41, at a surface of each filters. Accordingly, if the positioning of the filter plate 421 conducted by means of the motor 422 was not precise enough, all the incident light beams UC transmit the filter without being blocked by the filter plate 421, and an image is formed on the light receiving element 43. Image information obtained by receiving light at the light receiving element 43 is then sent to processing circuits 53 to 56 corresponding to each of the filters.

FIGS. 14A to 14D are graphs each showing a spectral transmission wavelength of each of the band pass filter 423, the red color transmitting filter 424, the green color transmitting filter 425 and the blue color transmitting filter 426, respectively.

Figure 14A:
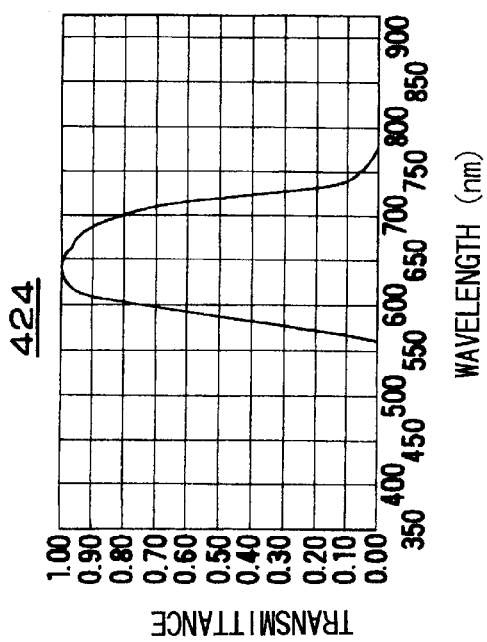
FIGS. 14A, 14B, 14C and 14D are graphs each showing a spectral transmittance wavelength of each of filters.

The band pass filter shown in FIG. 14A transmits light having the oscillation band ($\lambda$=690 nm in this embodiment) of the semiconductor lasers 21 and 31. The band pass filter 423 selectively transmits the measurement slit light U in the three-dimensional measurement and the reference spotlight UR in the preliminary measurement.

Figure 14B:
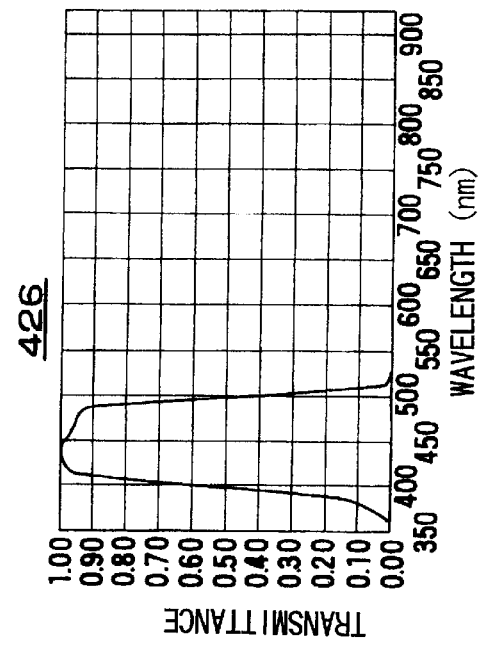
Figure 14C:
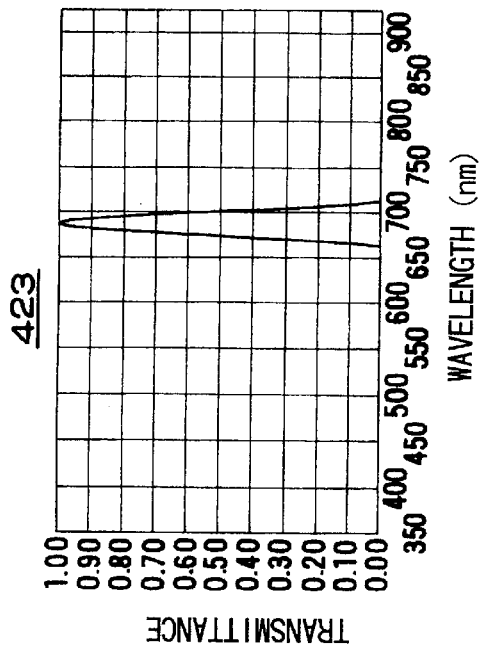
Figure 14D:
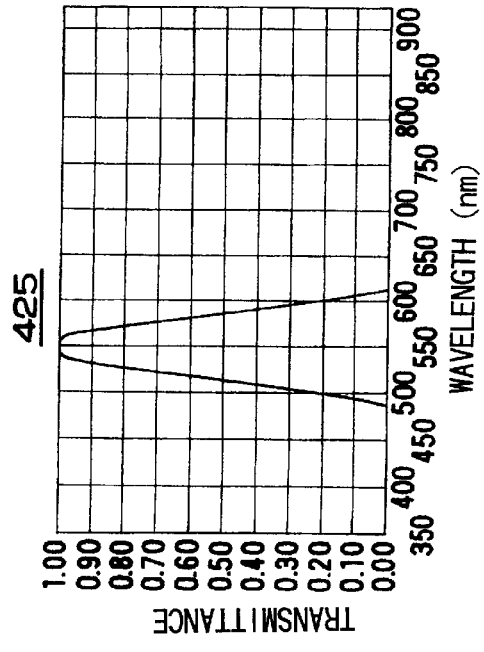

The filters 424 to 426 for the colors red, green and blue, which are required for color image formation, each has the spectral transmission wavelength corresponding to each of the colors as shown in FIGS. 14B to 14D.

Accordingly, an image obtained by three-dimensional measurements (measured data Ds) and a red color image, green color image and blue color image obtained by two-dimensional photographing are captured by the single light receiving element 43 under the conditions common to all the images such as a feed amount and an angle of view of the light receiving lens 41, thereby making it possible to obtain image information free from positional differences among the images.

Moreover, according to the present embodiment, a filter having a specific spectral transmission wavelength is used exclusively for capturing each of the images to obtain data reduced in noise otherwise caused by unnecessary wavelengths, thereby improving the measurement precision.

Figure 15A:
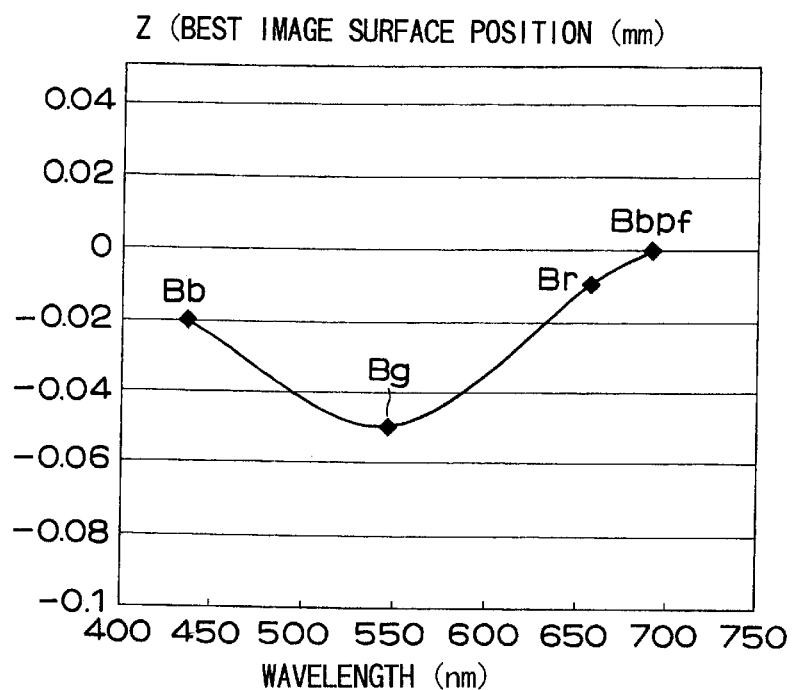
FIGS. 15A and 15B are graphs each showing the best image surface position when a filter is inserted into a light receiving lens system.
Figure 15B:
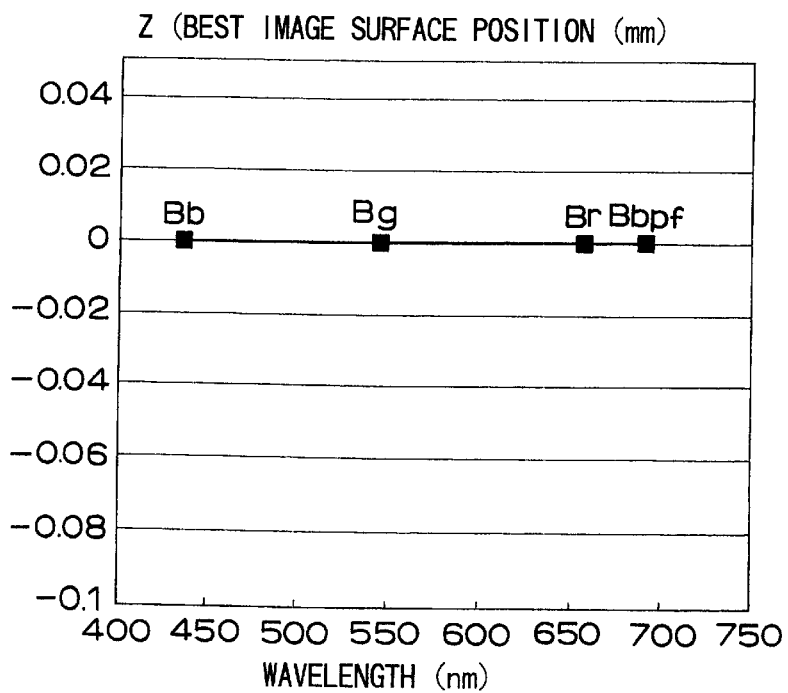

FIGS. 15A and 15B are graphs each showing the best image surface position when the filters 423 to 426 are inserted into the light receiving lens system 41. FIG. 15A shows image position before correction using filter thickness, and FIG. 15B shows image position after correction using filter thickness.

Bbpf denotes the best image surface position when the band pass filter 423 is inserted, and Br, Bg and Bb each denotes the best image surface position when each of the red color transmitting filter 424, the green color transmitting filter and the blue color transmitting filter 426 is inserted.

In this specification, the "best image surface" means an image surface whereat the axial MTF calculated by using a spatial frequency corresponding to a pixel size of the light receiving element 43 is at the peak. Calculation wavelength at the band pass filter 423 is the same as the wavelength of the semiconductor lasers ($\lambda$=690 nm), i.e., a wavelength for three-dimensional measurement. Red color, green color and blue color filters respectively have a representative wavelength of 656 nm, 546 nm and 436 nm.

In FIGS. 15A and 15B, the best image surface position Bbpf as the band pass filter 423 being inserted is represented as the original point of the image surface position, i.e., 0 mm.

FIG. 15A shows the best image surface position when the thickness of each of the filters 423 to 426 is 1 mm. It is apparent from the graph that the best image surface position differs at each of the filters due to the chromatic aberration of the light receiving lens system 41. Therefore, if the focusing was conducted with respect to an image passes through one filter; the focus disparity occurs when the filter is replaced by other filters. For example, in the case where focusing was conducted with respect to an image passed through the band pass filter, quality of images of red color, green color and blue color is deteriorated.

FIG. 15B shows the best image surface positions when thickness of the band pass filter 423, the red color filter 424, the green color filter 425 and the blue color filter 426 respectively as 1 mm, 1.03 mm, 1.15 mm and 1.05 mm. In this case, the chromatic aberration due to the wavelength of light passing through each filter is corrected by the difference in the thickness. Accordingly, the same best image surface position is obtainable irrespective of which filter a wavelength passes. Therefore, if focusing is conducted with respect to an image passed through any one of the filters; it is possible to attain satisfactory quality of image that is free from fuzziness even when the filter is exchanged; thereby solving the problem of difference in the image quality otherwise caused by the difference of wavelength.

When sizes of outer diameter and specific gravities of the filters 423 to 426 are the same, weights of the filters vary depending to thickness of the filters. Accordingly, if the filter plate 421 is in the form of positional symmetry with respect to the rotational axis 427 and each of the filters is attached to the position of the positional symmetry with respect to the rotational axis 427, the center of gravity G of the rotational member 420 is differed from the center position of the rotational axis 427, thereby affecting smooth rotation of the rotational member 420.

Therefore, forms and sizes of the filter plate 421 and the filters 423 to 426 are decided to have the center of gravity G of the rotational member 420 matches the position of the rotational axis 427. For example, the filter plate 421 may not be in the form of a positional symmetry with respect to the rotational axis, the filters 423 to 426 may have different outer diameter sizes or the filers 423 to 426 are attached to positions that are not symmetrical to the rotational axis 427.

A hall having a suitable diameter and depth may be provided at a suitable position of the filter plate 421 to adjust the center of gravity.

A diaphragm member of the light receiving lens system 41 can be formed by using the filter plate 421 as described below.

f-number of the light receiving lens system 41 can be defined by regulating an effective area of an optical path at the light receiving lens system 41 by applying the diameter Ef of each of the filters by positioning the filter plate 421 at the aperture stop position of the light receiving lens system 41.

For example, in order to regulate the f-number of the light receiving lens system 41 to be an optimum number at each of the filters, the outer diameters of the holes of the filter plate 421 and the filters 423 to 426 may be set to suitably smaller sizes than the largest optical path diameter Ex or a diaphragm plate having a small opening may be provided for each of the filters to have the light incident from the light receiving lens system 41 restricted in a certain amount at each of the filters.

Performance of the light receiving lens system 41 is generally improved by increasing the f-number, i.e., by darkening to improve the resolution and widening the depth of field (depth of focus). In obtaining a color image, difference in transmitted light of the red color filter, green color filter and blue color filter can be corrected by regulating the f-number of the light receiving lens system 41. Thus, adjustment of a so-called white balance is realized.

(Biaxial Adjustment Mechanism of Optical Unit)

Biaxial adjustment mechanism provided in the optical unit OU will be explained below.

Figure 16:
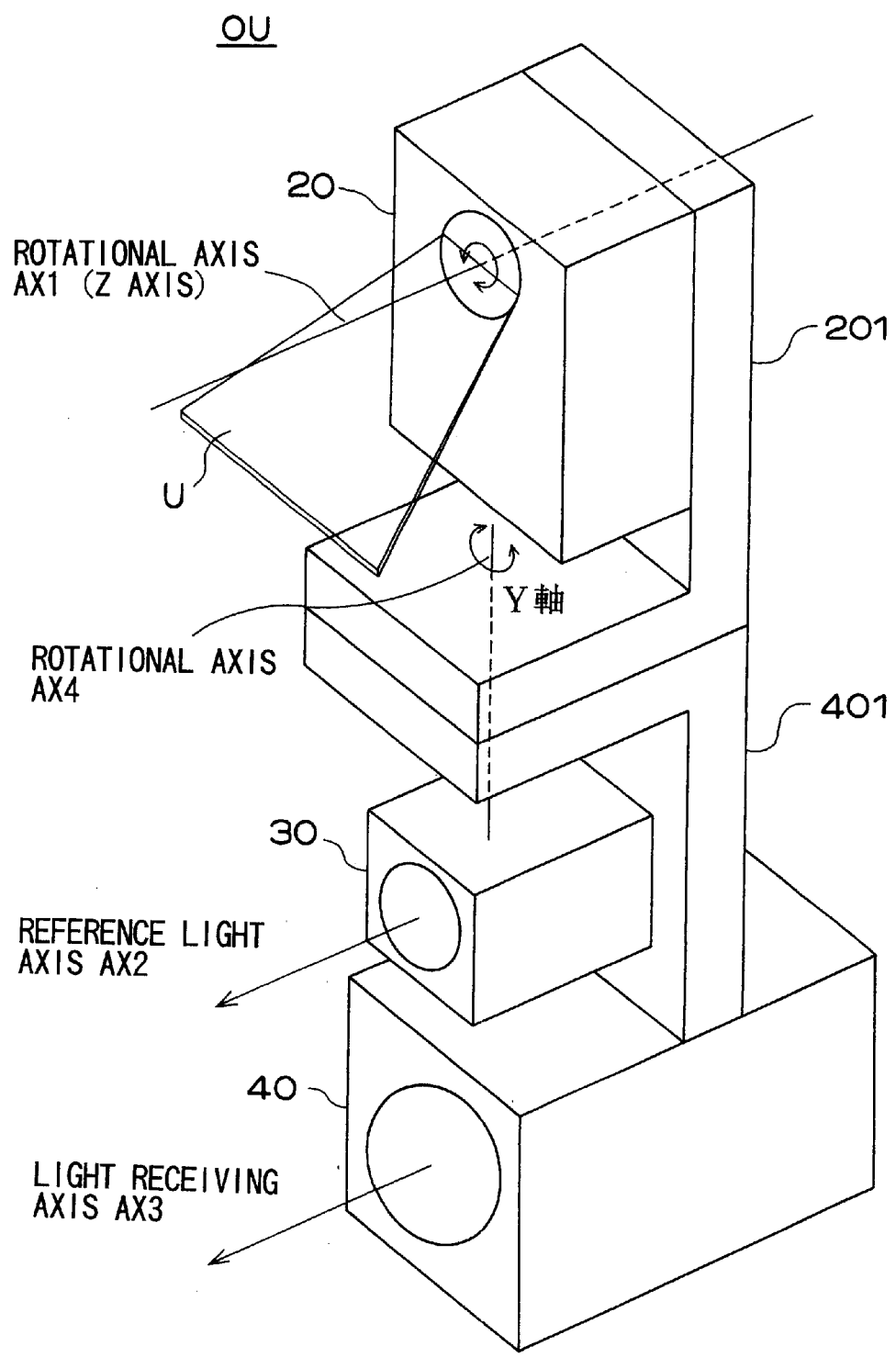
FIG. 16 is a perspective view schematically showing a biaxial adjustment mechanism of an optical unit.

FIG. 16 is a perspective view showing a schematic of the biaxial adjustment mechanism of the optical unit OU.

As shown in FIG. 16, the optical unit OU comprises the brackets 201 and 401 and the projection optical system 20, the reference light optical system 30 and the light receiving optical system that are mounted on the brackets.

The brackets 201 and 401 are rotatively connected to each other with the rotational axis AX4, which is a Y direction axis, being at center thereof. The projection optical system 20 is rotatively mounted on the bracket 201 as the rotational axis AX1, which is a Z direction axis, being at the center thereof.

The reference light optical system 30 and the light receiving optical system 40 are fixed to the bracket 401. The rotational axis AX1 is so adjusted as to be in parallel to the light receiving axis AX3 of the light receiving optical system 40.

Baseline AS connecting a start point A of projection in the projection optical system 20 with an imaging surface S of the light receiving optical system 40 and baseline RS connecting a starting point R of light projection in the reference light optical system 30 with the imaging surface S of the light receiving optical system 40 respectively are perpendicular to the light receiving axis AX3. Details of the biaxial adjustment of the optical unit OU are disclosed in U.S. Pat. No. 6,141,105.

(Calculation Principle of Image Position Produced by Irradiation of Reference Spotlight)

Figure 17A:
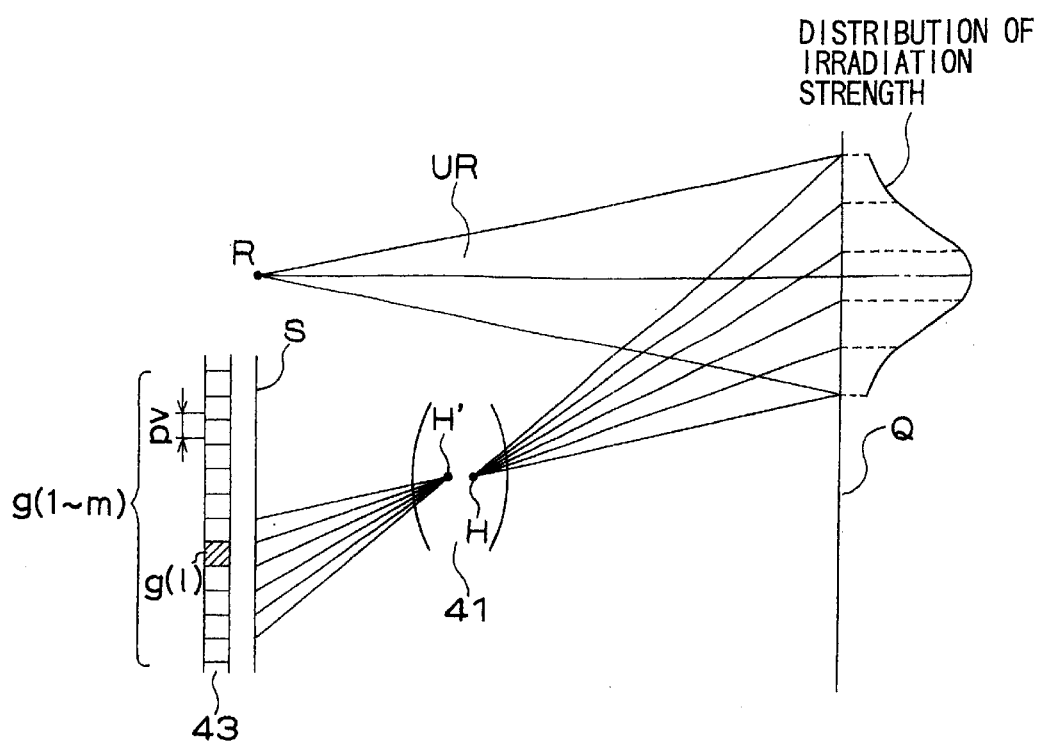
FIGS. 17A and 17B generally show a principle for calculating an image position made by the reference spotlight.
Figure 17B:
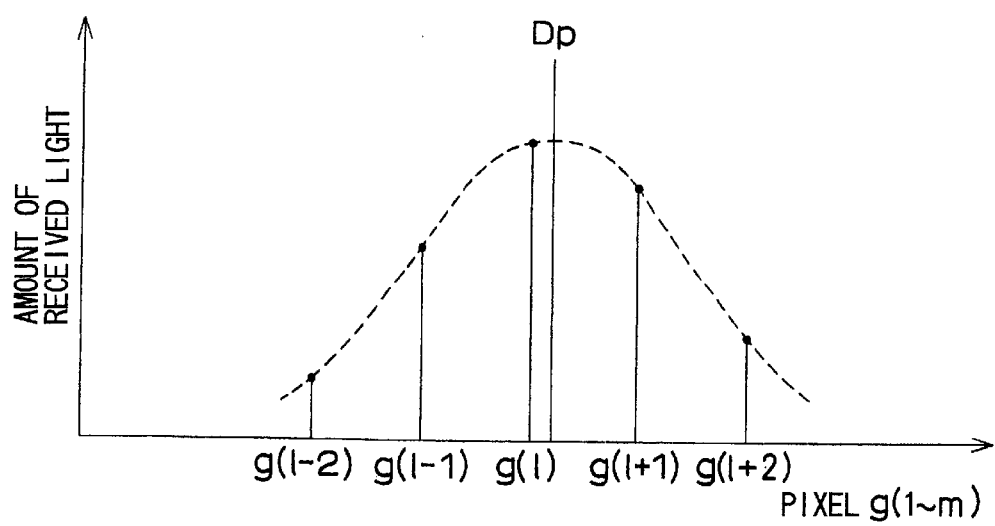

FIGS. 17A and 17B generally show a calculation principle of image position produced by irradiation of reference spotlight.

As shown in FIGS. 17A and 17B, the reference spotlight UR having relatively a wide width, which becomes plural pixels on the imaging surface S of the light receiving element 43, is irradiated on the object Q. In this example, the reference spotlight has a width of five pixels.

Received light data Dg for one frame is output from the light receiving element 43. Received light data effective for five pixels are obtainable from a single pixel line g (1~m) of the imaging surface S. Interpolation operation with respect to the received light data for five pixels enables to determine a coordinate position at which an amount of received light becomes the largest. The coordinate position thus determined is the image position obtained by irradiation of the reference spotlight UR (reference spot image position).

In the example shown in FIG. 17B, the amount of received light is the largest between the pixel g(l) and the successive pixel g (1+1). Thus, measurement with resolution which is higher than that defined by pixel pitch pv of the imaging surface S is realized.

In the measurement system 1 of the present embodiment, the received light data Dg for one sampling of the light receiving element 43 is output to the system controller 52, and the system controller calculated the reference spot image position data Dp based on the received light data Dg.

(Calculation Principle of Three-dimensional Data)

Figure 18A:
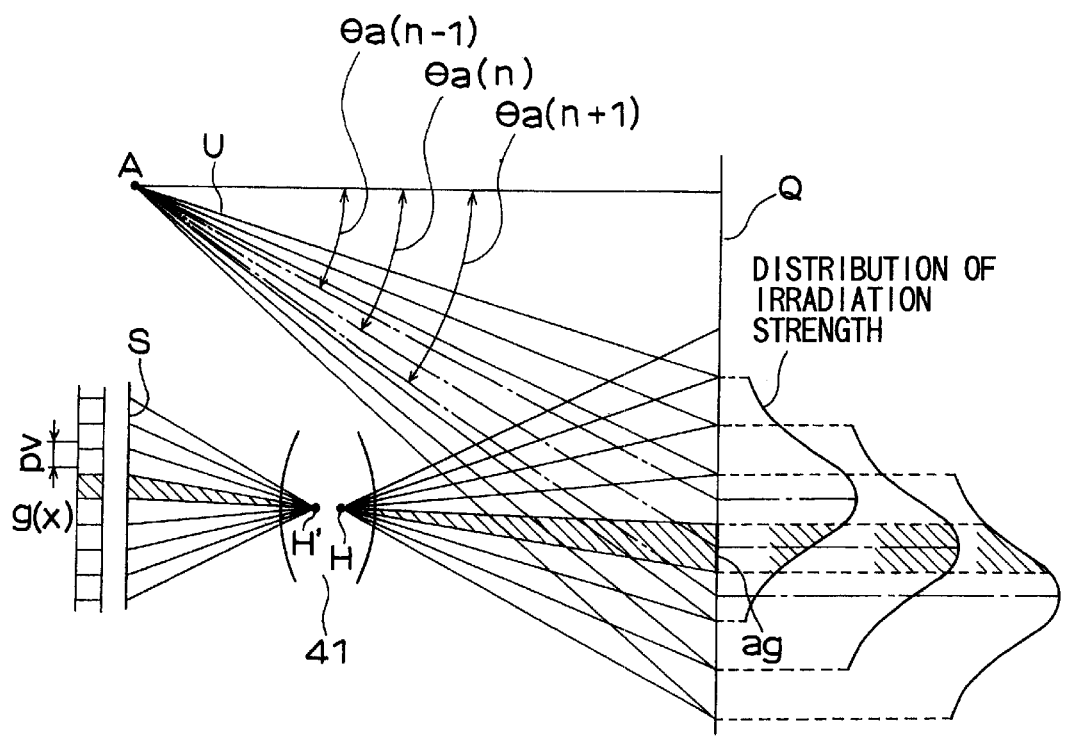
FIGS. 18A and 18B generally show a principle for calculating three-dimensional data.
Figure 18B:
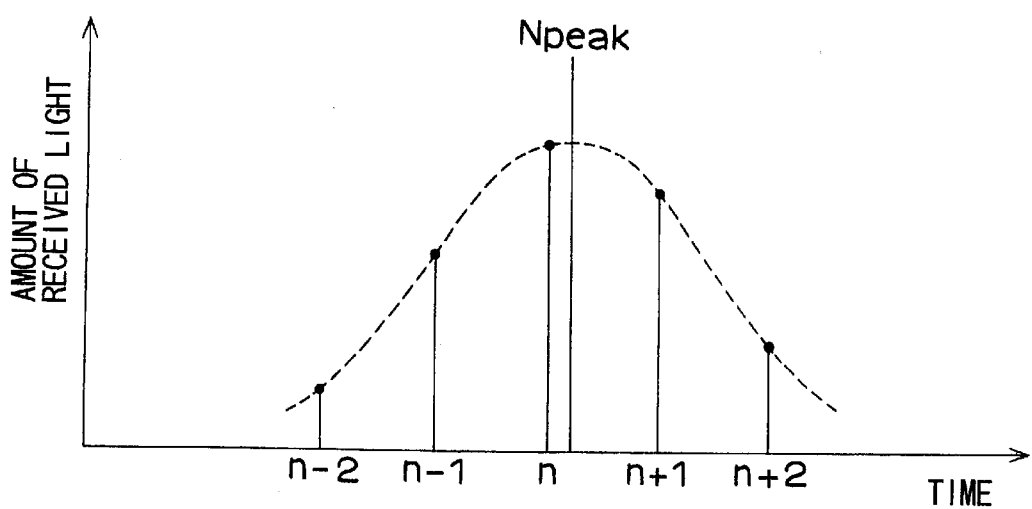

FIGS. 18A and 18B generally show calculation principle of three-dimensional data.

As shown in FIGS. 18A and 18B, measurement slit light U having a relatively wide width, which becomes plural pixels on the imaging surface of the light receiving element 43, is irradiated on the object Q. In this example, the measurement slit light U has a width of five pixels. The measurement slit light U is so deflected downward to move for one pixel pitch pv at every sampling period on the imaging surface S, thereby scanning the object Q.

Received light data Dg for one frame is output from the light receiving element 43 at every sampling period. From a single pixel line g (x) of the imaging surface S, effective light receiving data are obtainable in five samplings among N times of samplings conducted during scanning. By performing interpolation operation with respect to the light receiving data for five samplings, there is determined a timing (time whereat an amount of received light of pixel g (x) becomes largest, center of gravity of time Npeak) at which the optical axis of the measurement slit light U passes a surface ag of an object in an area corresponding to the pixel g (x). Center of gravity of time Npeak may also be called "time median point Npeak".

In the example shown in FIG. 18B, the amount of received light is the largest at the timing between nth time and successive time (n+1). A position (coordinate) of the object Q is calculated based on relationship between projection direction of the measurement slit light U at the above-obtained timing and incident direction of the measurement slit light U with respect to the pixel g(x). The position thus calculated enables measurement with resolution which is higher than that defined by pixel pitch pv of the imaging surface S.

In the measurement system 1 of the present embodiment, the three-dimensional camera 2 outputs the light receiving data for five samplings as the measured data DS to the host 3 at every pixel g (x) of the light receiving element, and the host 3 calculates three-dimensional coordinates of the object Q based on the measured data Ds.

The output processing circuit 53 serves to generate the measured data Ds corresponding to each pixels g (x) in the three-dimensional camera 2.

(Structure of Output Processing Circuit)

Figure 20:
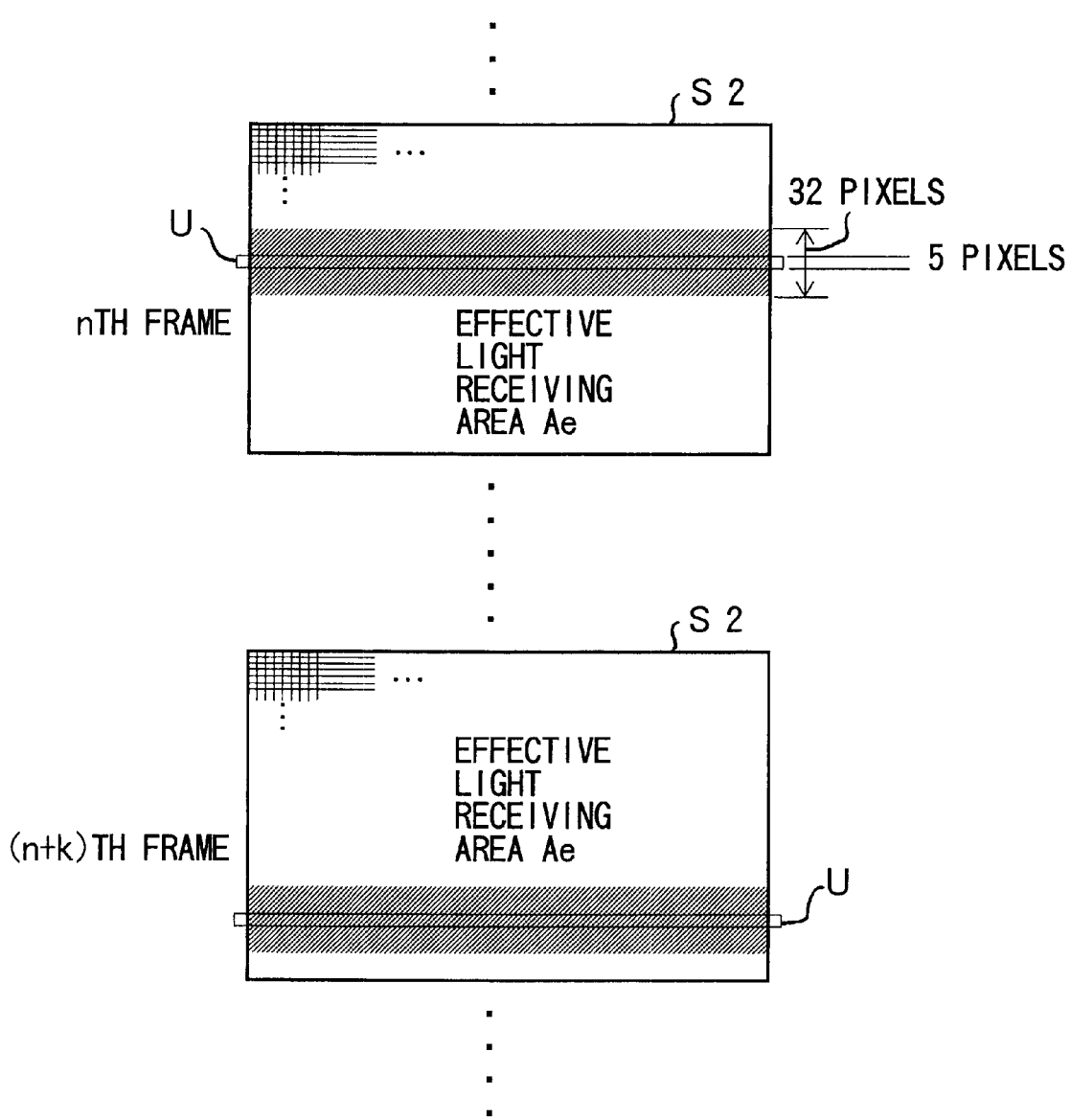
FIG. 20 shows a read out area of the light receiving element.

FIG. 19 is a block diagram showing the output processing circuit 53. FIG. 20 shows a read out area of the light receiving element 43.

The output processing circuit 53 comprises a clock generating circuit 530 for outputting clock signals CK, an amplifier 531 for optimizing a level of photoelectric conversion signals output by the light receiving element 43, an AD converter 532 for converting the photoelectric signals of pixels g into received light data Dg of 8 bits in synchronization with the clock signals CK, frame delay memories 533 to 536 in series connection, a comparator 537, a generator 538 for indicating a frame number (sampling number) FN, a multiplexer 539, six memories 540A to 540F, a warning judgment circuit 541, a scale generating circuit 542 and an image synthesizing circuit 543.

Gain of the amplifier 531 is variable and can be set to a suitable value by the system controller 52. The frame delay memories 533 to 536 serve to output received light data Dg for five frames with respect to each of the pixels g of the light receiving element 43 at the same time to the memories 540A to 540E.

The memories 540A to 540E memorizes effective received light data Dg for five samplings and each of which has a memory capacity for storing the received light data Dg equivalent to the number of the sampling (number of effective pixels of the light receiving element 43) of the measurement.

Output signals S537 of the comparator 537 are added to each of the memory 540B to 540F as write signals. In turn, one of the signals of the output signals S537 and the clock signals CK selected by the multiplexer 539 are added to the memory 540A as write signals.

In measurement successive to the preliminary measurement, i.e., in main measurement, reading out of one frame in the light receiving element 43 is conducted with respect to an effective light receiving area (strip image) Ae only, which is a part of the imaging surface S as shown in FIG. 20, in order to accelerate the measurement speed. The effective light receiving area Ae is shifted for one pixel at every frame in accordance with the deflection of the measurement slit light U.

In the present embodiment, number of pixels in the shifting direction in the effective light receiving area Ae is fixed to 32. Width of the 32 pixels corresponds to distance area as an object for measurement (measurable area). U.S. Pat. No. 5,668,631 discloses a method for reading out a part of photogtaphing image of a CCD area sensor.

The AD converter 532 serially outputs received light data Dg for 32 lines in the order of pixels g for each frame. The frame delay memories 533 to 536 are FIFO memories (first-in-first-out memories) having a capacity for 31 (=32−1) lines. The received light data Dg of the pixel g output from the AD converter 532 are compared with the largest value of previous received light data Dg of the pixel g memorized at the memory 540C by means of the comparator 536 when delayed for 2 frames. In the case where the received light data Dg thus delayed (output from the frame delay memory 534) are larger that the largest value, the output from the AD converter 532 and output from the frame delay memories 533 to 536 are stored at the memories 540A to 540E to rewrite memory contents of the memories 540A to 540E.

At the same time with the rewriting, frame number FN corresponding to the received light data Dg to be stored at the memory 540C are stored at the memory 540F. However, the frame number FN at this step is not the line number (pixel numbers in Y direction) through the whole parts of the imaging surface S, but line number in the effective light receiving area Ae having 32 pixels width and, therefore, has a value in-between 0 to 31. It is possible to specify the line number with respect to whole parts of the imaging surface S by an order of reading out of 32 lines (i.e. position of the pixel g in y direction) and frame number FN.

In the case where the amount of received light of the pixel g reached the largest on the nth line, data of (n+2)th line is stored at the memory 540A; data of (n+1)th frame are stored at the memory 540B; data of nth frame are stored at the memory 540C; data of (n-1)th frame are stored at the memory 540D; data of (n-2)the frame are stored at the memory 540E; and the number n is stored at the memory 540F. The measured data Ds to be sent to the host as the result of the main measurement is data wherein combined are the received light data Dg stored at the memories 540A to 540E and the frame number FN stored at the memory 540F.

The warning judgment circuit 541, the scale generating circuit 542 and the image synthesizing circuit 543 are circuits for a monitor display (preview) of measurement result. The received light data Dg from the memory 540C, the frame number FN from the memory 540F and a scale value sc from the system controller 52 are input in the warning judgment circuit 541. The warning judgment circuit 541 outputs distance image data Dd indicating a three-dimensional shape, which is the measurement result, in gray scale and warning signals S11 to S13.

The distance image data Dd is specifically brightness data contains three colors R, G and B for defining display colors of each pixels of an image. The scale generating circuit 542 generates a strip shaped gradation image 69 (scale bar) indicating relationship between the gradation of the distance image and distance between the measurement apparatus and an object. The image synthesizing circuit 543 incorporates display data of the scale bar 69 into the distance image data Dd.

(Preview Display of Measurement Result of Three-dimensional Position)

FIG. 21 is a block diagram showing the warning judgment circuit 541. FIG. 22 is a graph showing relationship between input and output of the warning judgment circuit 541.

The warning judgment circuit 541 comprises a pair of comparators 5411 and 5412 and look-up table (LUT) 5413. The light receiving data Ds of the effective pixel number are serially input for each pixel from the memory 540C to the comparator 5411 and 5412. The comparator 5411 outputs low brightness detection signals SL when value of the received light data Dg that indicates the largest amount of received light of the noted pixel is lower than the threshold value thB that is the lowest acceptable amount of received light. The comparator 5412 outputs overflow warning signals S13 when value of the received light data Dg exceeds the threshold value thA that is the highest value of the acceptable amount of received light. The LUT 5413 outputs distance image data Dd, approaching warning signals S11 and distant warning signals S12 depending on combination of values of the frame number FN, the scale value sc, the low brightness detection signal SL and the overflow warning signals S13.

The scale value sc indicates a position of a measurement reference surface in the measurable area defined by the width of the effective light receiving area Ae by values of 0 to 31. Default value of the scale value sc is 16. The frame number FN indicates a position of an object in the measurable area (more precisely, a position of a sampling point corresponding to the noted pixel). The distance image data Dd basically is data made by gray scale conversion off the frame number FN. Therefore, brightness Yr, Yg and Yb of the colors R, G and B in gray scale are equals to "8×(FN−sc+16)". However, in the present embodiment, a specific pixel is emphasized by color display so that the quality of the measurement result is understood visually and easily.

As shown in FIG. 22, display color of a pixel is black if the brightness detection signals SL is active (on). Thus, in the display screen, a pixel having an extremely small reflection rate of an object or a pixel outside the measurable area is displayed in black. In the case where the overflow warning signals S13 are active, the pixel causing the signals is displayed in red in order to let the user know that the center of the gravity of time Npeak cannot be calculated precisely. A pixel having the frame number FN equal to the scale value sc is displayed in cyan in order to help user to understand a positional relationship between the measurement reference surface and the object. An image corresponding to an edge at near side of the measurable area is displayed in green, and n image corresponding to an edge at distant side is displayed in blue. Such color display makes it easy for a user to confirm if the desired part of an object is precisely measured or not.

(Measurement Process of Three-Dimensional Position)

Operations of the three-dimensional camera 2 and the host 3 are explained below along with measurement process. Effective pixel number (number of sampling points) of a imaging surface S of an image sensor 53 used for the measurement is 480×640. Specifically, one frame consists of 480×640 pixels, and data for 480 frames are obtainable by 480 times of sampling. Therefore, substantial number of frames N is 480. The number of pixels in the longitudinal direction of the imaging surface S with respect to the slit light is 640.

(Setting Capturing area)

A user set a measurement area as a start in three-dimensional measurement.

In the case where an angle of view (focal length) of the light receiving lens system 41 is constant, the capturing area changes in proportion to the measurement distance. The capturing area can be set in such a manner that the user changes the measurement distance by moving the three-dimensional camera 2 or the object Q with watching a monitor image displayed on the liquid crystal display 6.

In the case where the setting with watching the monitor image on the liquid crystal display 6 is difficult for the user, the user can operate the reference light projection button 11 to project the reference spotlight UR in order to set the three-dimensional camera 2 and the object Q at positions where spot point of the reference spotlight UP projects on the object Q.

In the case of the measurement system 1 comprising the plural reference optical systems 30 (for example, in the case where the reference spotlights UR are projected from four reference optical systems as shown in FIG. 10), it is preferable to set the center of the object Q at the center of four spot points of the reference spotlights.

A user may change the angle of view as required. Setting of the angle of view is performed by exchanging and mounting any one of the light receiving lenses 41 having different angle of view (focal length) on the light receiving lens mount 441.

In the case of mounting the light receiving lens system 41 having zooming function, the angle of view can be changed by performing zooming operation using the zooming buttons 7*a* and 7*b*.

(Auto-focusing Control)

A user can select a manual focusing or an auto- focusing by operating the focusing switching button 8*a* and 8*b* during focusing of the light receiving optical system 40.

In the case of the manual focusing, the user operates the manual focusing buttons 9*a* and 9*b* to effect focusing drive of the light receiving lens system 41 with watching a monitor image displayed on the liquid crystal display 6, thereby focusing by way of the user's visual observation of the monitor.

In the case of the auto-focusing, the system controller 52 performs focusing control based on the focus detection method as described below.

Various conventional methods may be used as the focus detection method. For example, there may be employed the contrast detecting method, wherein contrast of image information is calculated depending on a feed amount of a light receiving lens and setting a position of the feed amount whereat the contrast is the largest as the focal point or there may be used the phase difference detecting method, wherein object light passed through difference areas of a light receiving lens are subject to image formations and focal points of the thus formed images are detected based on the phase differences among the images.

Further, in the case where the projection direction AX2 and the light receiving axis AX3 of the reference spotlight UR are not identical, it is possible to perform the auto-focusing control by determining the distance dO between the measurement apparatus and the object by employing the triangulation method.

In this case, the reference spotlight UR is projected from a single reference optical system 30 to the object Q first. Based on image information obtained by the light receiving element 43 at the time of projecting the reference spotlight UR, the system controller 52 calculates the reference spot image position data Dp and determine the distance dO using the baseline length L3 based on the triangulation method.

The system controller 52 refers to judgment result of the lens detector 44 (lens type Lk) and lens information table T2 and outputs the focusing feed amount Ed corresponding to the distance dO to the lens controller 51 in order to perform the auto-focusing control by controlling the focusing drive system 47 and moving the light receiving lens system 41 to the infocus position.

The lens information table T2 is a table containing relationship of the distance dO, focusing feed amount Ed and the image distance in the light receiving lens system 41, the distance between the lens principal points HH' and conditions to move zooming (when zooming lens is used), and is stored in a ROM (not shown) comprised in the system controller 52 as a table corresponding to the lens type Lk of the light receiving lens system 41.

(Preliminary Measurement)

When the start button 10 is operated, a preliminary measurement and a main measurement are conducted in this order. In the preliminary measurement, there are obtained operation settings for the main measurement and information for measurement conditions in the main measurement.

Operation setting items for the main measurement contain output of the semiconductor laser 21 (laser beam strength), deflection conditions of the measurement slit light U (projection start angle and projection finish angle and deflection angular speed for specifying projection angle area) and so on. Information of the measurement conditions to be obtained contain data for photographing conditions, data for reference spot image position and so on.

(Determination of Distance Between Object and Measurement Apparatus and Lens Drive Settings)

To optimize the measurable area, distance between an object and a measurement apparatus d is determined and the lens feed amount Ed is set. In the preliminary measurement, measurement slit light U is projected from the projection optical system 20.

The projection angle θa is so set with assuming that a flat-shaped object exists at the distance d0 as to a reflected light projects on the center of a imaging surface S.

The system controller 52 determines the distance d0 based on slit image position data in accordance with the triangulation method.

Figure 23A:
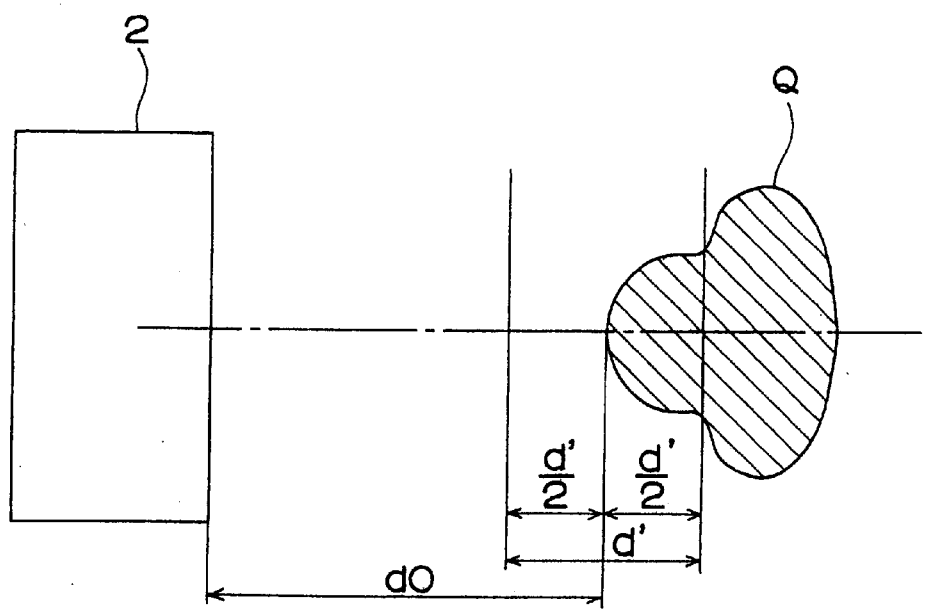
FIGS. 23A and 23B generally illustrates a relationship between a reference position for calculating a distance to an object and a measurable area.

When a reference position for calculating the distance between an object and a measurement apparatus is set at a position in the object that is nearest to the the three-dimensional camera 2, and a half of the measurable area d' is respectively set at front and rear positions of the reference position as shown in FIG. 23A, the measurable area at the front side (at the side of the three-dimensional camera 2) will be useless.

Figure 23B:
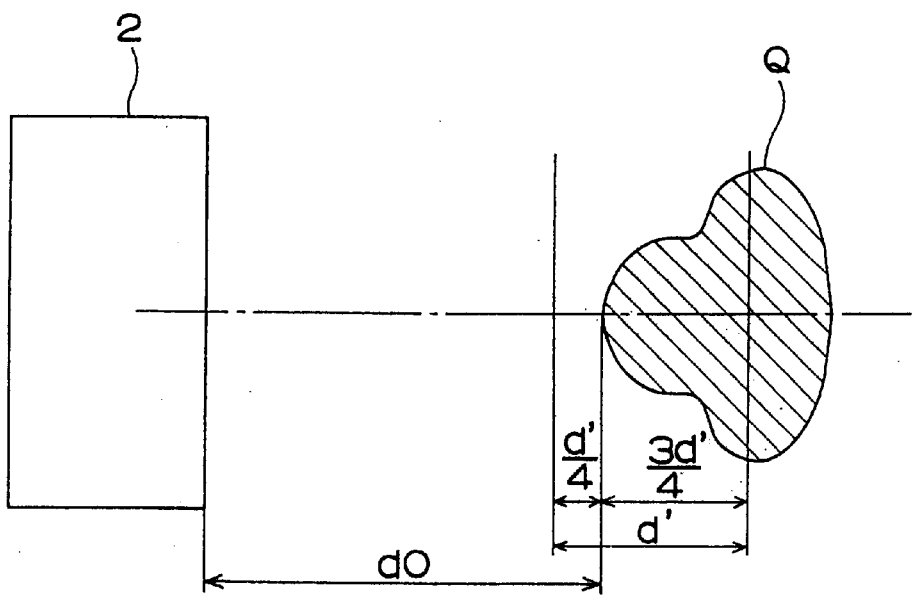

Therefore, as shown in FIG. 23B, a shift amount pitch off is so set as to shift the measurable area d' to the rear side until proportions of the front measurable area and the rear measurable area are 25% and 75%, respectively.

The distance d in the main measurement is suitably set, as shown in the following expression, by adding to the distance d0 25% of the front measurable area d'.

$$d=d0+d'/4$$

Based on the distance d thus determined, setting of the feed amount Ed and driving of the light receiving lens system 41 are performed.

(Settings for Output of Semiconductor Laser)

Projected light strength of the semiconductor laser is determined by measuring an amount of received light when measurement slit light U is projected by the semiconductor laser 21 of the projection optical system 20 via pulse-lighting.

Projection of the measurement light U is performed intermittently for three times in a short period of time, laser beam strength of each projection is varied from a large value to a small value. Thus, measurement using three types of measurement slit lights U each having strength of A, B and C (A>B>C) is conducted. Reliability of the measurement is increased by projecting the three types of measurement slit lights U.

Figure 24A:
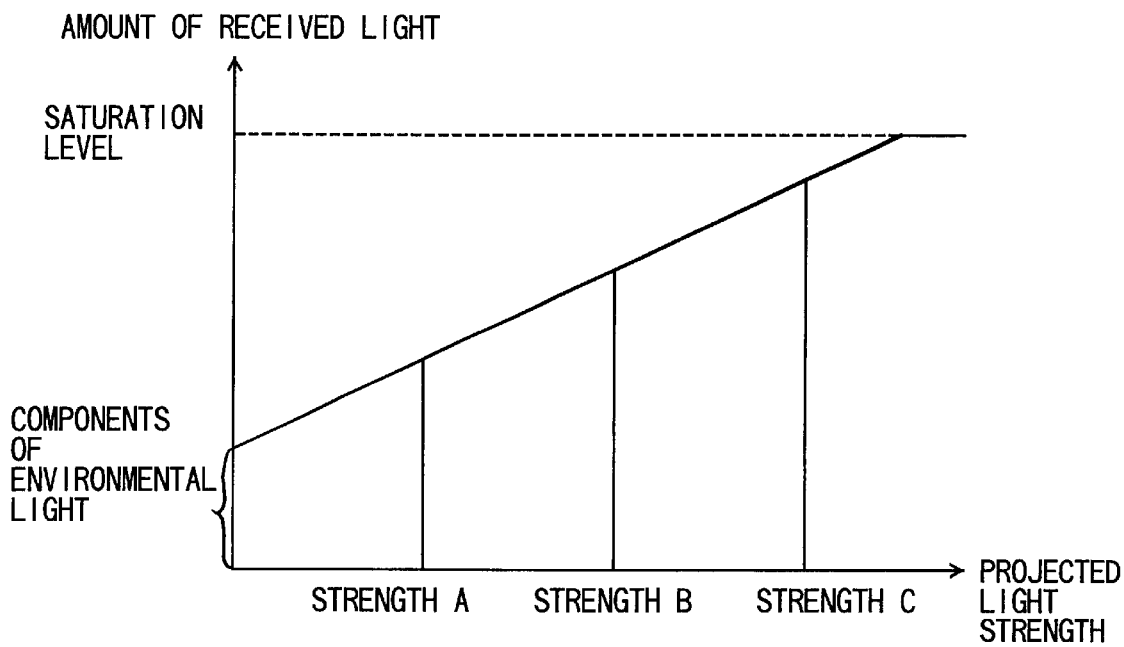
FIGS. 24A and 24B are graphs showing representative examples of relationship between a projected light strength and an amount of received light.
Figure 24B:
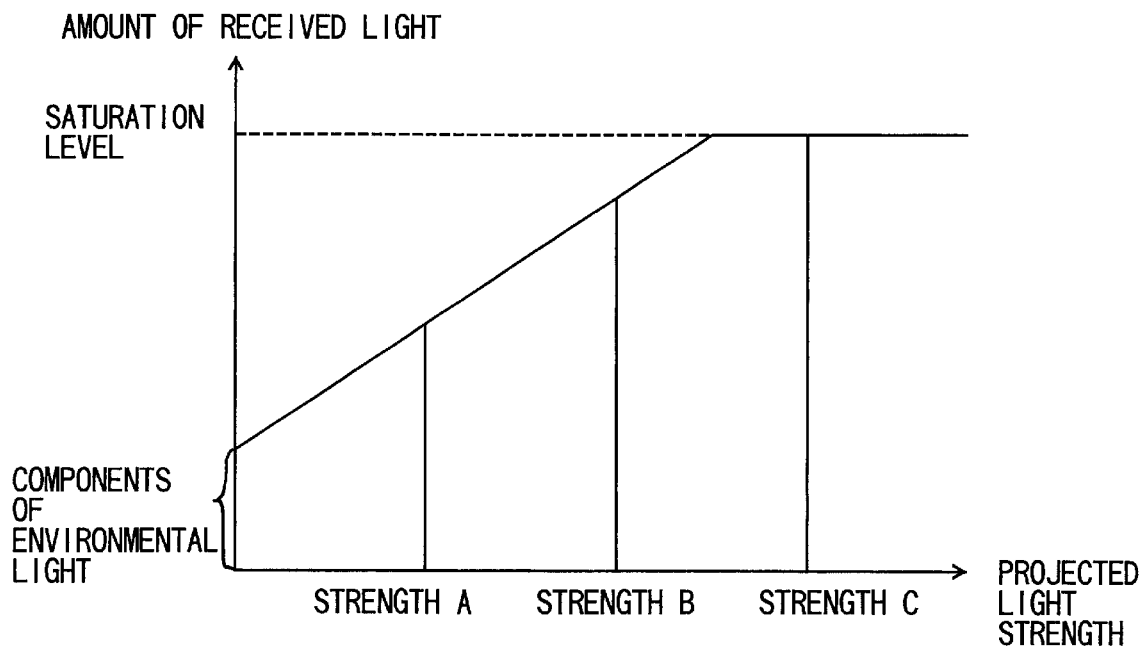

FIGS. 24A and 24B are graphs each showing a representative example of relationship of the projected light strength and the amount of received light.

In FIG. 24A, the levels of received light of strength A to C are lower than the saturation level (upper limit of dynamic range of received light). In FIG. 24B, the amount of received light is saturated in the strength C.

If thee level of received light is in the area of non-saturation and is free from environmental lights, a proportional relationship is established between the strength A to C and the received light data Dg. Therefore, it is possible to presume a level of received light in arbitrary projected light strength from the values of the received light data Dg of the strengths A to C. Thus, it is possible to determine projected light strength at which the optimum level of received light is obtainable by an operation. In the case where scale of the strengths A to C and scale of the received light data Dg do not correspond to each other, reliability of the received light data Dg is susceptible.

In the case where a satisfactory amount of received light cannot be obtained by setting the projected light strength to the acceptable upper limit considering safety to human body and rating of the semiconductor laser 21, the measurement is stopped with displaying a warning massage as well as making a warning sound.

(Conditions for Deflection of Measurement Slit Light)

Calculations for conditions for deflecting the projection start angle and the projection finish angle for specifying the projection angle area of the measurement light U, deflection angular speed and so on are performed by overscanning of a predetermined amount (for example, for 8 pixels) in order to maintain the same measurable area d' at the edge and at the center in the scanning direction. The projection start angle th1, projection finish angle th2 and deflection angular speed ω are represented by the following expressions (1), (2) and (3).

$$th1 = \tan^{-1}\left(\frac{\beta \times pv\left(\frac{np}{2}+8\right)+L}{d+doff}\right) \times \frac{180}{\pi} \quad (1)$$

$$th2 = \tan^{-1}\left(-\frac{\beta \times pv\left(\frac{np}{2}+8\right)+L}{d+doff}\right) \times \frac{180}{\pi} \quad (2)$$

$$\omega = \frac{th1-th2}{np} \quad (3)$$

β: imaging magnification (=d/effective focal length Freal)
pv: pixel pitch
np effective pixel number in Y direction of imaging surface S2
L: baseline length
(Setting of Projection Optical System Variator Lens)

Movement control of the variator lens 222 is performed based on a calculation result, i.e., an amount of movement of the variator lens 422 at the projection side obtained by an operation using the lens type (Lk) detected by the lens detector and encoder output of the zooming drive system 48 (when light receiving lens system is a zoom lens).

The lens control at the projection side is performed for enabling the light receiving element 43 to receive the measurement slit light U having a width of 5 pixels irrespective of a measurement distance and an angle of view.
(Obtaining of Information of Conditions for Measurement)

The system controller 52 reads the lens type Lk detected by the lens detector 45, encoder output from the focusing drive system 47 (the feed amount Ed) and encoder output fp of the zooming drive system 48 (when light receiving lens is a zoom lens) via the lens controller 51.

Data of photographing conditions T3 corresponding to the lens type Lk, the feed amount Ed and the zoom step amount fp are extracted from distortion aberration table T1 and lens information table T2 inside the system controller, and the extracted data of photographing conditions are output to the host 3.

The data of photographing conditions T3 contain distortion parameters (lens distortion correction factor dl and d2), distance between principal points HH' and image distance b.
(Obtaining of Reference Spot Image Position Data)

Reference spotlight UR is projected by lighting the semiconductor laser 31 of the reference optical system 30.

Based on the imaging information obtained by the light receiving element 43 at the time of projecting the reference spotlight UR, the system controller calculated the reference spot image position data Dp and outputs the data Dp after storing the data Dp once in a RAM (not shown) comprised in the system controller 52.
(Main Measurement)

In a main measurement, the object Q is scanned by the measurement slit light U and measured data Ds for 5 frames are generated per one pixel by the output processing circuit 53. The measured data thus generated are then set to the host 3. At the same time, the conditions for deflection (deflection control data Da) and apparatus information Db indicating a technical specification, etc. of the light receiving element 43 are sent to the host 3.

Figure 25:
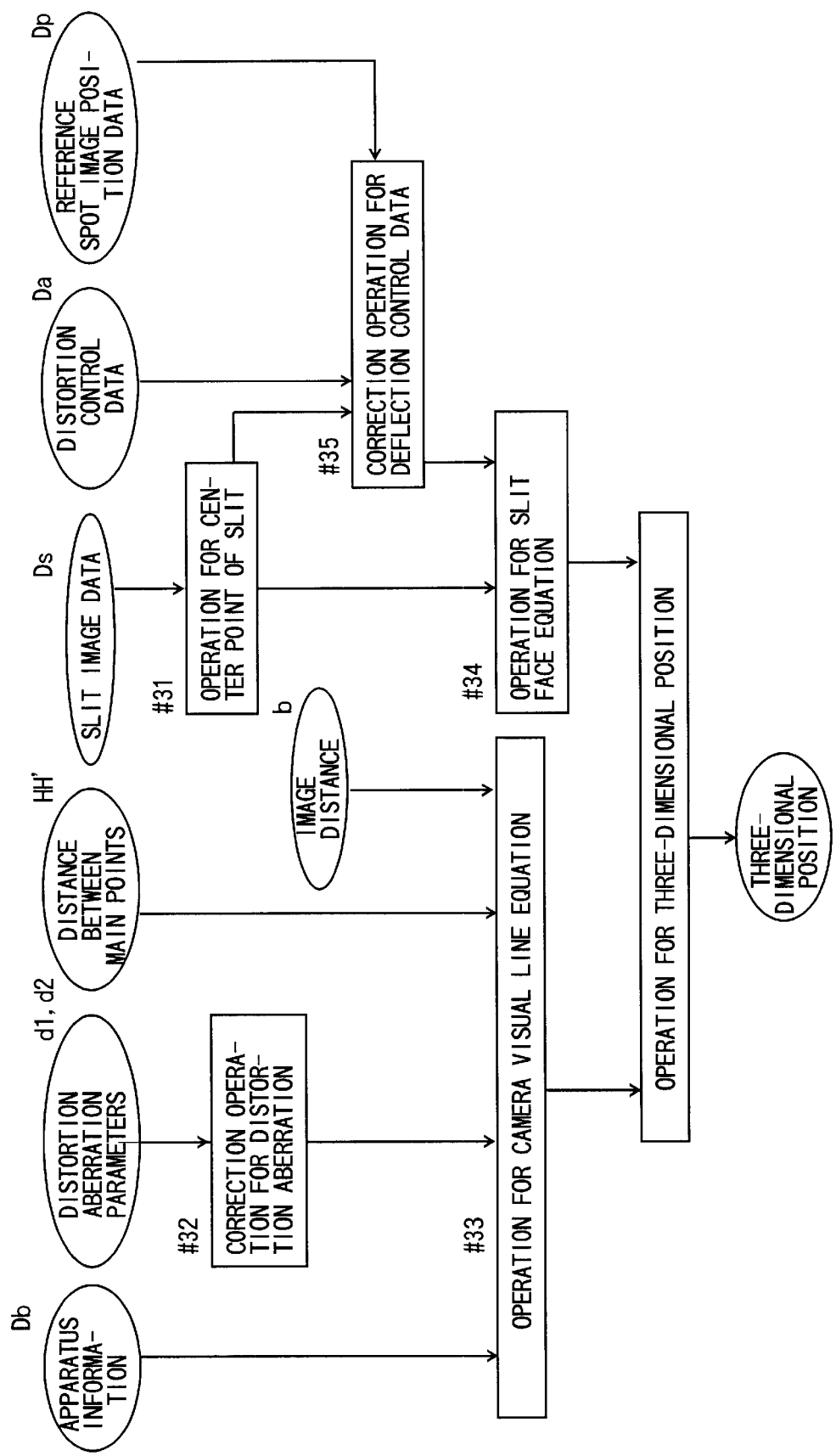
FIG. 25 is a flow chart showing a flow of data in a host.
Figure 26A:
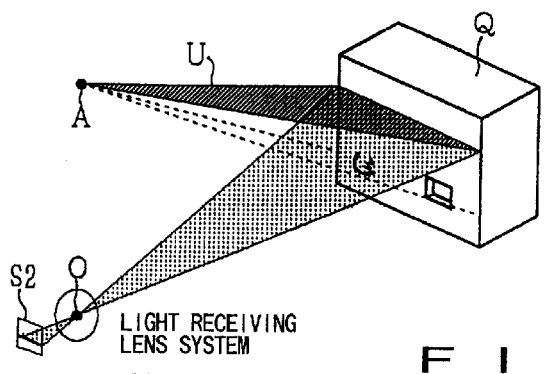
FIGS. 26A, 26B, 26C and 26D generally show a slit light projection method.
Figure 26B:
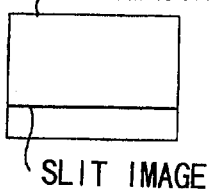
Figure 26C:
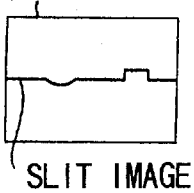
Figure 26D:
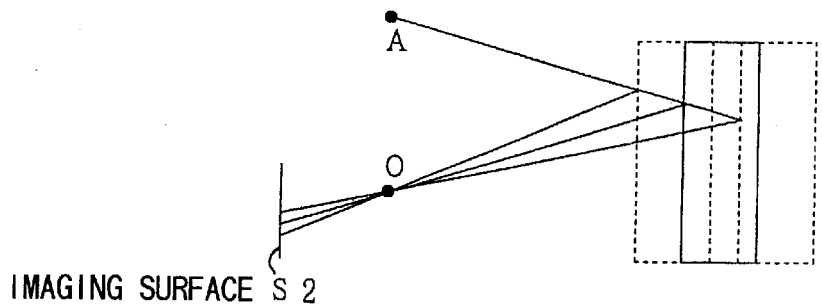

As shown in FIG. 25, the host 3 performs operation for center of gravity of slit #31, operation for camera visual line equation #33, operation for slit surface equation #34, correction operation for deflection control data #36, correction operation for distortion #32 and operation for three-dimensional position #35.
(Operation for Center of Gravity of Slit)

The center of gravity of time Npeak of the measurement slit light U (see FIGS. 18A and 18B) is obtained by the following expression (4) or (4') using received light data Dg(i) obtained by each sampling.

$$Npeak=n+\Delta n$$

$$\Delta n = \frac{-2 \times Dg(n-2) - Dg(n-1) + Dg(n+1) + 2 \times Dg(n+2)}{\Sigma Dg(i)} \quad (4)$$

$$(i = n-2, n-1, n, n+1, n+2)$$

$$\Delta n = \frac{-2[Dg(n-2)-m] - [Dg(n-1)-m] + [Dg(n+1)-m] + 2[Dg(n+2)-m]}{\Sigma Dg(i)} \quad (4')$$

m: smallest value minDg(i) in five received light data

It is possible to reduce influence of the environmental lights by obtaining a weighted average as subtracting the smallest data minDg(i) in five received light data.
(Operation for Camera Visual Line Equation)

The camera visual line equation is represented by the following expression (5) and (6).

$$(u-uo) = xp = \frac{b}{pu} \times \frac{X}{Z-FH} \quad (5)$$

$$(v-vo) = yp = \frac{b}{pv} \times \frac{Y}{Z-FH} \quad (6)$$

-continued b: image distance

FH: front side principal point pu: pixel pitch in horizontal direction in imaging surface pv: pixel pitch in vertical direction in imaging surface u: pixel position in horizontal direction in imaging surface u0: postition of center pixel in horizontal direction in imaging surface v: pixel position in vertical direction in imaging surface v0: position of center pixel in vertical direction in imaging surface (Operation for Slit Surface Equation)

The slit surface equation is represented by the following expression (7).

$$\begin{bmatrix} \cos(the3) & -\sin(the3) & 0 \\ \sin(the3) & \cos(the3) & 0 \\ 0 & 0 & 1 \end{bmatrix} \begin{bmatrix} \cos(the2) & 0 & \sin(the2) \\ 0 & 1 & 0 \\ -\sin(the2) & 0 & \cos(the2) \end{bmatrix} \quad (7)$$

$$\begin{bmatrix} 1 & 0 & 0 \\ 0 & \cos(the1 + the4 \cdot nop) & -\sin(the1 + the4 \cdot nop) \\ 0 & \sin(the1 + the4 \cdot nop) & \cos(the1 + the4 \cdot nop) \end{bmatrix}$$

$$\begin{bmatrix} 0 \\ 1 \\ 0 \end{bmatrix} [X \quad Y - L \quad Z - s]$$

the1: rotational angle about X axis the2: inclination about Y axis the3: inclination about Z axis the4: angular speed about X axis nop: slit passing time = center of gravity of time Npeak L: baseline length s: offset of start point A (Correction of Deflection Control Data)

In the slit surface equation of expression (7), the slit light passing time nop is defined as variable. The timing at which the measurement slit light U logically passes the reference spot image position obtained in the preliminary measurement (when the scanning is performed normally) is obtained by calculation, and then time difference tx between the actual timing at which the measurement slit light U passes the reference spot image position in the main measurement and the timing obtained by the calculation is calculated.

Timing error of deflection can be corrected by adding the time difference tx to the slit light passing time nop.

Specifically, as in the present embodiment, it is possible to correct error in the projection start time th1 in the case where there is only one reference spot image position, i.e., in measurement where only one reference optical system 30 is used.

In the case where plural reference optical systems 30 are comprised in the three-dimensional camera, it is possible to correct the timing errors at plural points, thus to realize corrections of both of the projection start time th1 and the deflection angular speed ω.

(Correction Operation for Distortion Aberration)

Geometric aberration depends on an angle of view. Distortion typically occurs symmetrically with the center pixel as being at the center thereof. Amount of the distortion is represented by a function of distance from the center pixel.

In this embodiment, approximation is performed by using a cubic function of distance. Quadratic correction coefficient is denoted by d1, and cubic correction coefficient is denoted by d2. Positions u', v' after the correction are represented by the following expressions (8) and (9).

$$u' = u + d1 \times t2^2 \times \frac{u - u0}{t2} + d2 \times t2^3 \times \frac{u - u0}{t2} \quad (8)$$

$$v' = v + d1 \times t2^2 \times \frac{v - v0}{t2} + d2 \times t2^3 \times \frac{v - v0}{t2} \quad (9)$$

$$t2 = \frac{1}{t1}$$

$$t1 = (u - u0)^2 + (v - v0)^2$$

In above expression (5) and (6), if u is substituted by u' and v is substituted by v', three-dimensional position excluding the distortion can be obtained.

(Operation for Three-dimensional Position)

Three-dimensional position of a sampling point (coordinates X, Y, Z) is an intersection of a camera visual line (line connecting the sampling point and the front principal point H) and a slit surface (optical axis of the measurement slit light u irradiating the sampling point).

By operating an intersection among the camera visual line equations (5) and (6) and the slit surface equation (7), the three-dimensional positions (coordinates X, Y, Z) of 480× 640 sampling points.

As to calibration, detailed descriptions are disclosed in Electronics Information Communication Workshop Document, PRU91–113, "Geometric correction of image without camera positioning", by Onodera and Kanetani; Electric information Communication Workshop Article D-II, vol. J74-D-II No. 9, pp.1227–1235, '91/9, "High performance calibration method of range finder based on three-dimensional model of optical system", by Ueshiba, Yoshimi and Oshima, and so on.

In above embodiment, three optical filters 424 to 426 that transmit lights each having a wavelength of R, G and B are used as a second optical filter; however, various optical filters having other wavelength selectivity may be used as the second optical filter. For example, optical filters each transmitting a wavelength of each stimuli of X, Y and Z may be used. A multiple of optical filters each transmitting an arbitrary narrow wavelength different to one another may be used for obtaining a spectral radiation brightness of an object. By using the multiple of optical systems, not only a two-dimensional image for shear display but also an image obtained by measuring a color or a spectral radiation brightness of an object can be displayed.

In above embodiment, the measurement slit light U or the reference spotlight UR only is projected from the projection optical system 20 or the reference optical system 30 only when the band pass filter 42 is located on the optical path of the light receiving lens 41 by the filter selector. Thus, useless light projection is prevented.

In above embodiment, it is possible to change a part or whole parts of the structure, form, size, number, material, contents of process, order of process of the filter selector 42, the filter plate 421, the projection optical system 20, the reference optical system 30, the light receiving optical system 40, the three-dimensional camera 2 or the measurement system 1 as required without deviating the scope and spirit of the present invention.

What is claimed is:

1. A three-dimensional shape measuring apparatus comprising:
    a light projector for projecting light to an object;
    a light receiving element;
    a light receiving optical system for leading light projected on and then reflected by the object to the light receiving element;
    the light receiving optical system including a first optical filter which transmits only light having substantially the same range of wavelengths as that of the light projected from the light projector, at least one second optical filter which transmits light having a different range of wavelengths as that of the first optical filter and a filter selector which selectively locates one of the first optical filter or the second filter or filters at an optical path of the light receiving optical system; and
    a calculator for obtaining measured data for three- dimensional shape measurement based on signals output from the light receiving element.

2. The three-dimensional shape measuring apparatus according to claim 1, wherein
    the second optical filter includes three optical filters each transmitting a wavelength of each of colors of red, green and blue for obtaining a two-dimensional image of the object.

3. The three-dimensional shape measuring apparatus according to claim 1, wherein
    the second optical filter includes three optical filters each transmitting a wavelength of each of stimuli X, Y and Z for obtaining a two-dimensional image of the object.

4. The three-dimensional shape measuring apparatus according to claim 1, wherein
    the second optical filter includes a plurality of optical filters transmitting wavelengths different to each other for obtaining a two-dimensional image indicating a spectral radiation brightness of the object.

5. The three-dimensional shape measuring apparatus according to claim 1, wherein
    thickness of the first optical filter and the second optical filter are so set as to correct color aberration caused by a wavelength of light beams transmitting each of the filters.

6. The three-dimensional shape measuring apparatus according to claim 1, wherein
    a diaphragm member for regulating an amount of light to be transmitted is provided for at least one of the first optical filter and the second optical filter.

7. The three-dimensional shape measuring apparatus according to claim 1, wherein
    the filter selector comprises:
    a rotational plate rotatably provided, with an axis being at the center thereof, to which the first optical filter and the second optical filter are attached at rotational angular positions different to each other and
    a motor for rotationally driving the rotational plate as being so controlled as to position the rotational plate in a state where the first optical filter or the second optical filter is inserted into an optical path of the light receiving optical system.

8. A three-dimensional shape measuring apparatus comprising:
    a light projector for projecting light to an object;
    a light receiving element;
    a light receiving optical system for leading light projected on and then reflected by the object to the light receiving element;
    the light receiving optical system including a first optical filter which transmits only light having substantially the same range of wavelengths as that of light in a specific range of wavelengths used for the three-dimensional measurement, at least one second optical filter which transmits light in a range of wavelengths used for obtaining a two-dimensional image and a filter selector which selectively locates one of the first optical filter or the second filter or filters at an optical path of the light receiving optical system; and
    a calculator for obtaining measured data for three- dimensional shape measurement based on signals output from the light receiving element.

9. The three-dimensional shape measuring apparatus according to claim 8, wherein
    the second optical filter includes three optical filters each transmitting a wavelength of each of colors red, green and blue.

10. The three-dimensional shape measuring apparatus according to claim 8, wherein
    the second optical filter includes three optical filters each transmitting a wavelength of each of stimuli X, Y and Z.

11. The three-dimensional shape measuring apparatus according to claim 8, wherein
    the second optical filter includes a plurality of optical filters transmitting wavelengths different to each other for obtaining an image indicating a spectral radiation brightness of the object.

12. The three-dimensional shape measuring apparatus according to claim 8, wherein
    thickness of the first optical filter and the second optical filter are so set as to correct color aberration caused by a wavelength of light beams transmitting each of the filters.

13. The three-dimensional shape measuring apparatus according to claim 8, wherein
    a diaphragm member for regulating an amount of light to be transmitted is provided for at least one of the first optical filter and the second optical filter.

14. The three-dimensional shape measuring apparatus according to claim 8, wherein
    the filter selector comprises:
    a rotational plate rotatably provided, with an axis being at the center thereof, to which the first optical filter and the second optical filter are attached at rotational angular positions different to each other and
    a motor for rotationally driving the rotational plate as being so controlled as to position the rotational plate in a state where the first optical filter or the second optical filter is inserted into an optical path of the light receiving optical system.

* * * * *